(12) United States Patent
Guest et al.

(10) Patent No.: US 10,517,354 B2
(45) Date of Patent: Dec. 31, 2019

(54) SEGMENTED TUNNELS ON ARTICLES

(71) Applicant: NIKE, Inc., Beaverton, OR (US)

(72) Inventors: Stefan E. Guest, Portland, OR (US); Matthew J. Holmes, Portland, OR (US); Yoav Sterman, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 16/028,306

(22) Filed: Jul. 5, 2018

(65) Prior Publication Data
US 2018/0326652 A1 Nov. 15, 2018

Related U.S. Application Data

(63) Continuation of application No. 15/370,893, filed on Dec. 6, 2016, now Pat. No. 10,144,173.
(Continued)

(51) Int. Cl.
A43C 1/06 (2006.01)
B29C 64/106 (2017.01)
(Continued)

(52) U.S. Cl.
CPC ............ A43C 1/06 (2013.01); A43B 3/26 (2013.01); A43B 13/181 (2013.01); A43B 13/22 (2013.01);
(Continued)

(58) Field of Classification Search
CPC ......... A41D 27/00; A41F 1/00; A43B 13/181; A43B 13/22; A43B 23/00; A43B 23/02;
(Continued)

(56) References Cited

U.S. PATENT DOCUMENTS 5,181,331 A * 1/1993 Berger ............... A43B 1/0072
24/712.1
6,052,921 A * 4/2000 Oreck .................... A43C 1/00
36/50.1
(Continued)

FOREIGN PATENT DOCUMENTS

GB 601440 5/1948
WO WO 2008/007403 1/2008

OTHER PUBLICATIONS

International Search Report and Written Opinion, dated Mar. 24, 2017, for corresponding International Patent Application No. PCT/US2016/065185, 15 pages.

Primary Examiner — Robert Sandy
Assistant Examiner — David M Upchurch
(74) Attorney, Agent, or Firm — Klarquist Sparkman, LLP

(57) ABSTRACT

Collapsible tunnel systems or segmented tubular structures may be printed on or otherwise attached to base layers on articles of apparel, articles of footwear, or other articles of manufacture. The collapsible tunnel systems have two or more tubular structures attached to the base layer, with tunnels extending through the tubular structures. A tensile strand may be laced through the tunnels in the tubular structure such that when tension is applied to the tensile strand, the tunnels may collapse into a structure with a continuous tunnel through two or more tubular structures. In some embodiments, two or more segmented tubular structures each have two spaced-apart tubular structures joined by a connecting portion, and a tensile strand extending through tunnels in the tubular structures.

19 Claims, 23 Drawing Sheets

Related U.S. Application Data

(60) Provisional application No. 62/263,891, filed on Dec. 7, 2015, provisional application No. 62/263,916, filed on Dec. 7, 2015, provisional application No. 62/263,923, filed on Dec. 7, 2015, provisional application No. 62/263,898, filed on Dec. 7, 2015, provisional application No. 62/263,834, filed on Dec. 7, 2015.

(51) Int. Cl.

| | |
|---|---|
| *B33Y 10/00* | (2015.01) |
| *B33Y 80/00* | (2015.01) |
| *B29D 35/12* | (2010.01) |
| *A43B 3/26* | (2006.01) |
| *A43B 13/18* | (2006.01) |
| *A43B 13/22* | (2006.01) |
| *A43B 23/02* | (2006.01) |
| *A43B 23/00* | (2006.01) |
| *A43B 23/24* | (2006.01) |
| *A43C 1/00* | (2006.01) |
| *A43C 1/04* | (2006.01) |
| *A43C 7/00* | (2006.01) |
| *A43C 11/16* | (2006.01) |
| *B29C 64/00* | (2017.01) |
| *B29C 64/112* | (2017.01) |
| *B29C 64/30* | (2017.01) |
| *A43B 23/04* | (2006.01) |
| *B29K 101/12* | (2006.01) |
| *B29L 31/50* | (2006.01) |
| *B29L 31/00* | (2006.01) |

(52) U.S. Cl.
CPC .............. *A43B 23/00* (2013.01); *A43B 23/02* (2013.01); *A43B 23/0245* (2013.01); *A43B 23/042* (2013.01); *A43B 23/24* (2013.01); *A43C 1/00* (2013.01); *A43C 1/04* (2013.01); *A43C 7/00* (2013.01); *A43C 11/16* (2013.01); *B29C 64/00* (2017.08); *B29C 64/106* (2017.08); *B29C 64/112* (2017.08); *B29C 64/30* (2017.08); *B29D 35/12* (2013.01); *B33Y 10/00* (2014.12); *B33Y 80/00* (2014.12); *A43D 2200/60* (2013.01); *B29K 2101/12* (2013.01); *B29K 2995/0082* (2013.01); *B29L 2031/505* (2013.01); *B29L 2031/727* (2013.01)

(58) Field of Classification Search
CPC ....... A43B 23/0245; A43B 23/24; A43B 3/26; A43C 11/16; A43C 1/00; A43C 1/04; A43C 1/06; A43C 5/00; A43C 7/00; A43D 1/02; A43D 8/22; B29C 64/00; B29C 64/106; B29C 64/112; B29C 64/30; B29C 67/0059; B29D 35/12; B29K 2101/12; B29K 2995/0082; B29L 2031/505; B29L 2031/727; B33Y 10/00; B33Y 50/02; B33Y 80/00; B41J 3/4078
See application file for complete search history.

(56) References Cited

U.S. PATENT DOCUMENTS

| | | | |
|---|---|---|---|
| 6,082,867 A * | 7/2000 | Chien | A43B 1/0072 |
| | | | 313/512 |
| 6,088,936 A * | 7/2000 | Bahl | A43B 7/20 |
| | | | 36/50.1 |
| 7,370,440 B1* | 5/2008 | Cole, III | A43B 5/003 |
| | | | 36/50.1 |
| 8,713,820 B2 | 5/2014 | Kerns et al. | |
| 8,747,717 B2 | 6/2014 | Greene et al. | |
| 8,790,475 B2 | 7/2014 | Cheng | |
| 8,844,168 B2* | 9/2014 | Toraya | A43C 1/00 |
| | | | 36/50.1 |
| 2005/0198866 A1 | 9/2005 | Wiper et al. | |
| 2006/0000116 A1 | 1/2006 | Brewer | |
| 2007/0266598 A1* | 11/2007 | Pawlus | A43B 13/141 |
| | | | 36/102 |
| 2009/0151055 A1* | 6/2009 | Duncan | A42B 1/048 |
| | | | 2/410 |
| 2010/0319216 A1* | 12/2010 | Grenzke | A43B 11/00 |
| | | | 36/54 |
| 2014/0020192 A1 | 1/2014 | Jones et al. | |
| 2014/0067106 A1 | 3/2014 | Makeig | |
| 2014/0157627 A1* | 6/2014 | Smaldone | A43B 5/0401 |
| | | | 36/83 |
| 2014/0196316 A1 | 7/2014 | Follet | |
| 2014/0245638 A1 | 9/2014 | Seamarks et al. | |
| 2014/0259783 A1 | 9/2014 | Dinndorf et al. | |

* cited by examiner

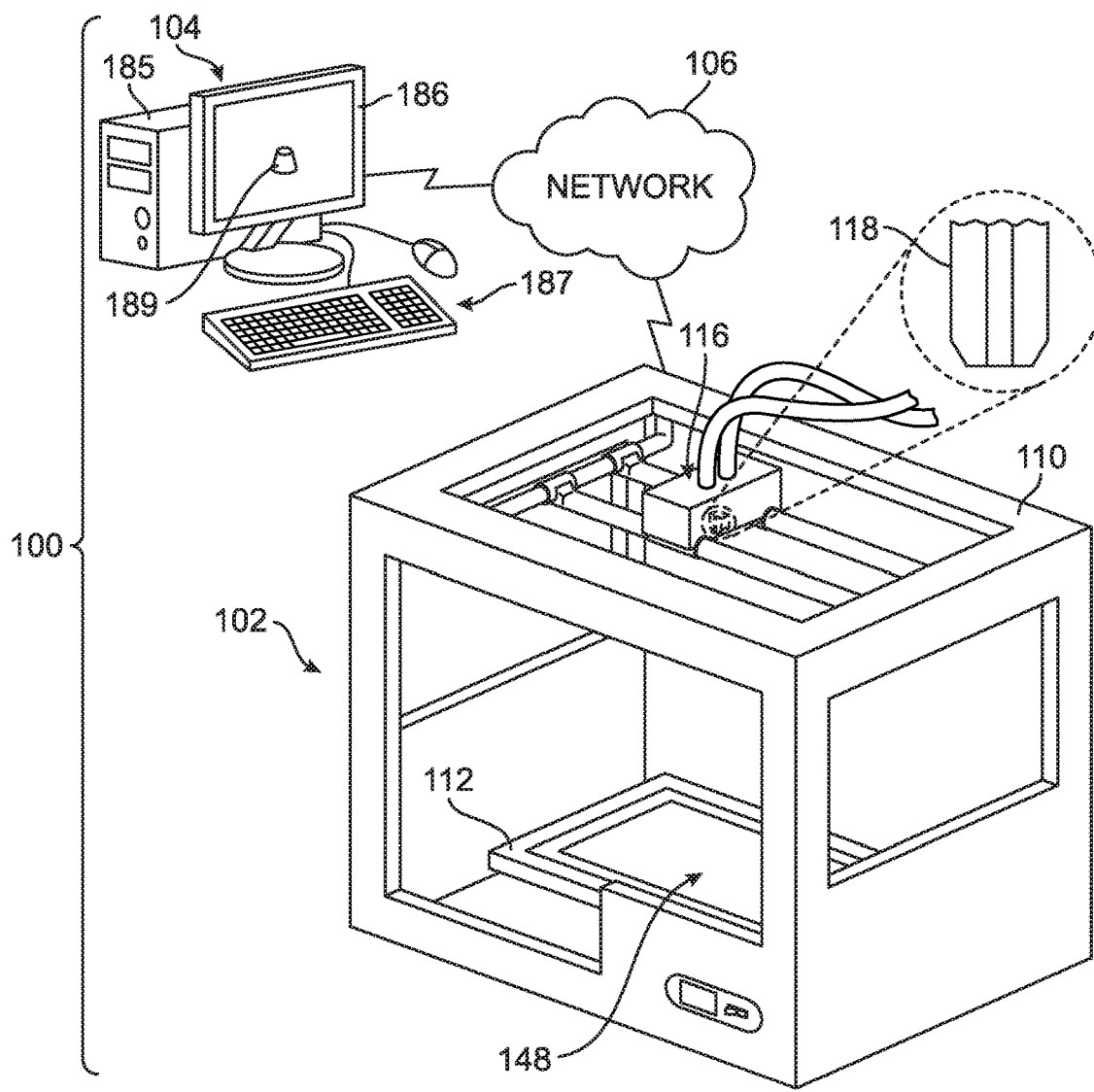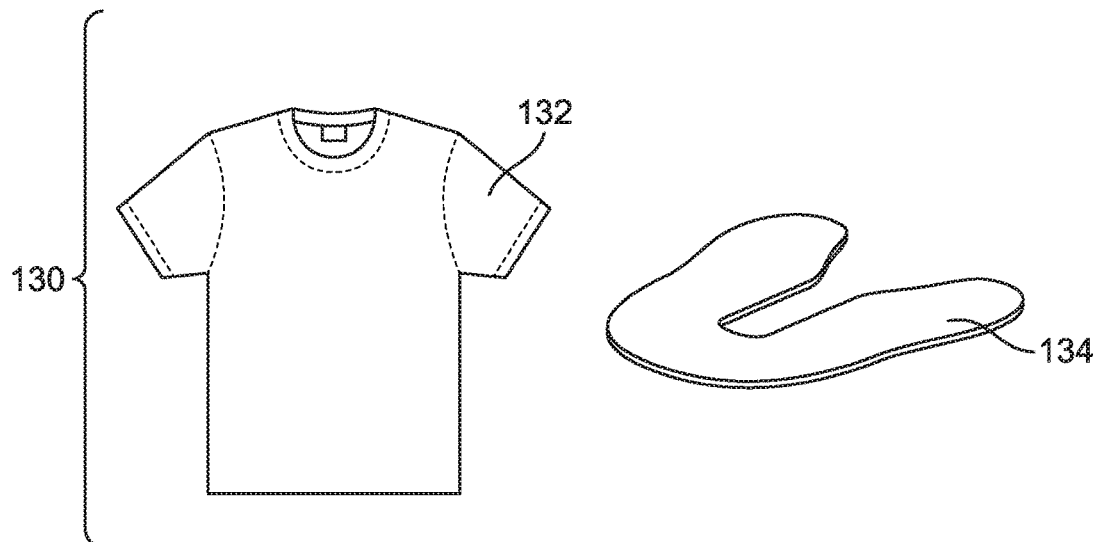
FIG. 1

US 10,517,354 B2

SEGMENTED TUNNELS ON ARTICLES

CROSS REFERENCE TO RELATED APPLICATION

This application is a continuation of U.S. patent application Ser. No. 15/370,893, filed Dec. 6, 2016, which claims the benefit of U.S. Provisional Application No. 62/263,916, filed on Dec. 7, 2015, U.S. Provisional Application No. 62/263,923, filed Dec. 7, 2015, U.S. Provisional Application No. 62/263,898, filed Dec. 7, 2015, U.S. Provisional Application No. 62/263,834, filed Dec. 7, 2015, and U.S. Provisional Application No. 62/263,891, filed Dec. 7, 2015, the disclosures of which are herein incorporated by reference in their entirety.

FIELD

The present embodiments relate generally to structures that may be used with articles of footwear, articles of apparel and/or protective gear.

BACKGROUND

Articles of footwear generally include two major components, a sole which is the primary contact with the ground or playing surface, and an upper for enclosing the wearer's foot. The upper is secured to the sole. The upper is generally adjustable using tensile strands such as laces, cables, strings or other materials to secure the article of footwear comfortably to the foot. Articles of apparel may also be adjustable using tensile strands such as laces, cables, strings or other materials to tighten or close the article of apparel. Protective gear are often attached to a wearer's elbow or knees, for example, using tensile strands such cables or laces, for example.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 1 is a schematic diagram of an embodiment of a three-dimensional printing system, also showing examples of articles that may be used with the three-dimensional printing system;

DETAILED DESCRIPTION

Figure 2:
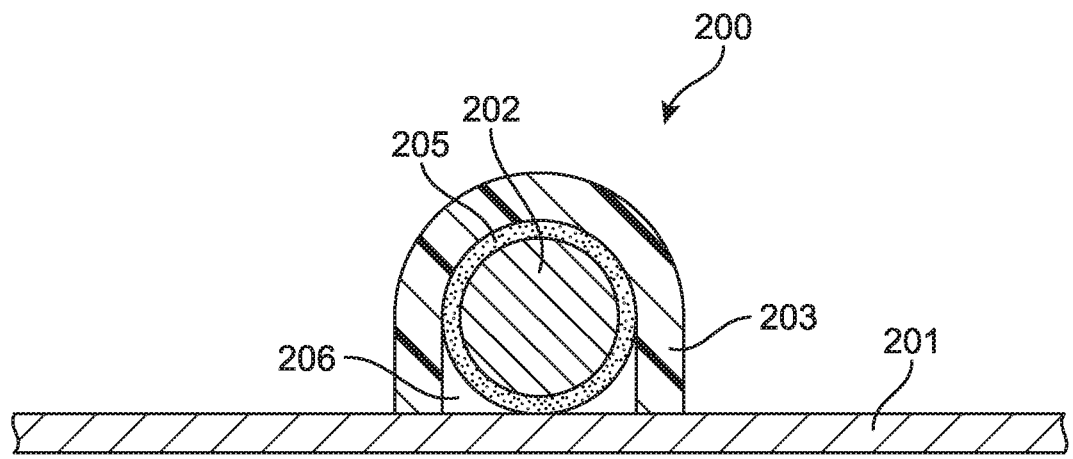
FIG. 2 is a schematic diagram of a cross section of an embodiment of a tubular structure.

Embodiments of the collapsible tunnel system or segmented tubular structures may be printed on or otherwise attached to base layers on articles of apparel, articles of footwear, or other articles of manufacture. The collapsible tunnel systems have two or more tubular structures attached to the base layer, with tunnels extending through the tubular structures. A tensile strand such as a cable, lace, cord, or string may be laced through the tunnels in the tubular structure such that when tension is applied to the tensile strand the tunnels may collapse into a structure with a continuous tunnel through two or more tubular structures. In some embodiments, two or more segmented tubular structures each have two spaced-apart tubular structures joined by a connecting portion, and a tensile strand extending through tunnels in the tubular structures.

The collapsible tunnel systems or the segmented tunnels may be applied to articles of manufacture using three-dimensional printing systems, or by using other additive manufacturing techniques such as welding, applying adhesives, fusing or sewing. Three-dimensional printing systems and methods may be associated with various technologies including fused deposition modeling (FDM), electron beam freeform fabrication (EBF), selective laser sintering (SLS) as well as other kinds of three-dimensional printing technologies. Structures formed from three-dimensional printing systems can be used with objects formed by other manufacturing techniques. These include textile materials used in various articles of footwear, articles of apparel and/or protective articles.

In one aspect, embodiments of the collapsible tunnel system attached to a base layer may have a first tubular structure attached to the base layer. The first tubular structure may have a first end portion and a second end portion, and a first tunnel extending from the first end portion to the second end portion. The embodiments may also have a second tubular structure attached to the base layer. The second tubular structure may have a third end portion and a fourth end portion, with a second tunnel extending from the third end portion to the fourth end portion. The embodiments may have a tensile strand extending through the first tunnel and the second tunnel. The collapsible tunnel system thus can have a first configuration in which the second end portion of the first tubular structure is spaced apart from the third end portion of the second tubular structure and a second configuration in which the second end portion of the first tubular structure is closer to the third end portion of the second tubular structure than in the first configuration. Tension may be applied across a portion of the tensile strand to place the collapsible tunnel system in the second configuration.

In another aspect, embodiments of a collapsible tunnel system may be attached to a base layer and may include a first tubular structure attached to the base layer. The first tubular structure may have a first end portion, a second end portion, and a curved portion between the first end portion and the second end portion, and a first tunnel extending from the first end portion to the second end portion. The first tunnel may curve through the curved portion of the first tubular structure. Embodiments may also have a second tubular structure attached to the base layer that has a third end portion and a fourth end portion, with a second tunnel extending from the third end portion to the fourth end portion. The embodiments may also have a tensile strand extending through the first tunnel and the second tunnel. The collapsible tunnel system may have a first configuration in which the second end portion of the first tubular structure is spaced apart from the third end portion of the second tubular structure, and a second configuration in which the second end portion of the first tubular structure is in contact with the third end portion of the second tubular structure such that the first tunnel is continuous with the second tunnel in the second configuration. Tension may be applied across a portion of the tensile strand to place the collapsible tunnel system in the second configuration. In the second configuration, the first tunnel and second tunnel provide a nonlinear path for the tensile strand.

In another aspect, embodiments have a tensioning system attached to a base layer including a first segmented tubular structure that has a first tubular structure attached to the base layer and a second tubular structure attached to the base layer. The first tubular structure has a first tunnel and the second tubular structure has a second tunnel. The first tubular structure may be attached to the second tubular structure by a first connecting portion, such that the first tunnel is spaced apart from the second tunnel by the first connecting portion. Embodiments also have a second segmented tubular structure with a third tubular structure attached to the base layer and a fourth tubular structure attached to the base layer. The third tubular structure has a third tunnel and the fourth tubular structure has a fourth tunnel. The third tubular structure is attached to the fourth tubular structure by a second connecting portion. The third tunnel is spaced apart from the fourth tunnel by the second connecting portion. A tensile strand extends through the first tunnel, the second tunnel, the third tunnel, and the fourth tunnel. The first segmented tubular structure is spaced apart from the second segmented tubular structure.

In another aspect, embodiments of a tensioning system attached to a base layer have a first tubular structure attached to a first portion of the base layer and a second tubular structure attached to a second portion of the base layer. The base layer has an intermediate portion extending between the first portion and the second portion. The first tubular structure has a first end portion and a second end portion, and includes a first tunnel extending from the first end portion to the second end portion. The embodiments have a second tubular structure that has a third end portion and a fourth end portion, with a second tunnel extending from the third end portion to the fourth end portion. A tensile strand extends through the first tunnel and the second tunnel. The first tubular structure and the second tubular structure are spaced apart so that an exposed portion of the tensile strand extends between the first tubular structure and the second tubular structure. The exposed portion of the tensile strand is next to the intermediate portion of the base layer. Applying tension across the tensile strand changes the geometry of the intermediate portion of the base layer.

Certain aspects, advantages, and novel features of the embodiments of this disclosure are described herein in the context of various embodiments; however, the disclosed methods, systems, and apparatus are not limited to any specific aspect, feature, or combination thereof. For example, the embodiments disclosed herein may make use of any of the structures, components and/or methods as disclosed in U.S. Patent Application No. 62/263,916, filed Dec. 7, 2015, titled "Article of Footwear with Tubular Structures," the entirety of which is herein incorporated by reference. The embodiments may also make use of any of the structures, components and/or methods as disclosed in U.S. Patent Application No. 62/263,923, filed Dec. 7, 2015, titled "Tunnel Spring Structures," the entirety of which is herein incorporated by reference. The embodiments may make use of any of the structures, components and/or methods as disclosed in U.S. Patent Application No. 62/263,898, filed Dec. 7, 2015, titled "Article of Footwear with Tubular Structures Having Tab Portions," the entirety of which is herein incorporated by reference. The embodiments may make use of any of the structures, components and/or methods as disclosed in U.S. Patent Application No. 62/263,834, filed Dec. 7, 2015, titled "Three-Dimensional Printing Utilizing a Captive Element," the entirety of which is herein incorporated by reference.

Other systems, methods, features, and advantages of the embodiments will be, or will become, apparent to one of ordinary skill in the art upon examination of the following figures and detailed description of embodiments illustrated in the figures. It is intended that all such additional systems, methods, features, and advantages be included within this description, be within the scope of the embodiments, and be protected by the following claims.

The embodiments described below are illustrated schematically in the drawings as tubular structures and segmented tubular structures that have certain geometries and relative dimensions, as shown in the drawings. However, embodiments of the tubular structures and the segmented tunnel structures may have different shapes, such as curved, bent, or other nonlinear geometries, and may have any appropriate range of dimensions such as their inner diameters, their outer diameters, their wall thicknesses and their lengths. They may also have cross sections with any geometry, such as circular, oval, rectangular, square, hexagonal, or other polygonal geometry, or may have any combination of the foregoing.

Segmented tunnels may be applied to a base layer by using additive manufacturing techniques such as three-dimensional printing, welding, adhesive application, fusing, or sewing. Thus, although the embodiments described herein are described as being fabricated using three-dimensional printing, other additive manufacturing methods may alternatively be used to fabricate the articles of manufacture described herein.

FIG. 1 is a schematic diagram of an embodiment of a three-dimensional printing system 100, also referred to in this specification simply as printing system 100. FIG. 1 also illustrates several exemplary articles 130 that may be used with printing system 100. Referring to FIG. 1, printing system 100 may include printing device 102 in communication with CAD system 104 over network 106.

Embodiments may use various kinds of three-dimensional printing (or other additive manufacturing) techniques. Three-dimensional printing, or "3D printing," comprises various technologies that may be used to form three-dimensional objects by depositing successive layers of material on top of one another. Exemplary 3D printing technologies that could be used include, but are not limited to, fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP) as well as various other kinds of 3D printing or additive manufacturing technologies known in the art.

In the exemplary embodiment shown in FIG. 1, printing device 102 of printing system 100 uses fused filament fabrication to produce three-dimensional parts. An example of a printing device using fused filament fabrication (FFF) is disclosed in Crump, U.S. Pat. No. 5,121,329, issued on Jun. 9, 1992, titled "Apparatus and Method for Creating Three-Dimensional Objects," which application is herein incorporated by reference and referred to hereafter as the "3D Objects" application. Embodiments of the present disclosure may make use of one or more of the systems, components, devices, and methods disclosed in the 3D Objects application.

Printing device 102 may include housing 110 that supports the devices and components used for three-dimensional printing on articles of manufacture. In some embodiments, printing device 102 may include printing nozzle assembly 116 and platform 112 for supporting the article to be printed on. In some embodiments, platform 112 may be controlled to move within housing 110 in the horizontal plane as well as in a vertical direction. In other embodiments, platform 112 may be fixed in one or more directions, and printing nozzle assembly 116 may be controlled to move in one or more directions. Moreover, in some cases, printing nozzle assembly 116 and/or platform 112 may be configured to rotate and/or tilt about one or more axes.

In the exemplary embodiment of FIG. 1, CAD system 104 may comprise central processing device 185, monitor 186, and input devices 187 (such as a keyboard and mouse), and software for designing a computer-aided design ("CAD") representation 189 of a printed structure. In at least some embodiments, CAD representation 189 of a printed structure may include information related to the materials required to print various portions of the structure as well as information about the geometry of the structure.

In some embodiments, printed structures may be printed directly to one or more articles. The term "articles" is intended to include articles of footwear (e.g., shoes) and articles of apparel (e.g., shirts, pants, etc.), as well as protective gear and other articles of manufacture. As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or gear that bears additive components. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. As used throughout this disclosure, the terms "article of apparel," "apparel," "article of footwear," and "footwear" may also refer to a textile, natural fabric, synthetic fabric, knit, woven material, nonwoven material, mesh, leather, synthetic leather, polymer, rubber, and foam.

In an exemplary embodiment, printing device 102 may be configured to print one or more structures directly onto a portion of one of exemplary articles 130. Exemplary articles 130 comprise exemplary articles that may receive a printed structure directly from printing device 102, including article of apparel 132, as well as an upper for article of footwear 134. Printing device 102 may be used to apply printed material to flat articles or to articles that may be flattened, as shown in FIG. 1. Printing device 102 may also be used to print directly onto articles that have a three-dimensional configuration.

In order to apply printed materials directly to one or more articles, printing device 102 may be capable of printing onto the surfaces of various kinds of materials. Specifically, in some cases, printing device 102 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic materials, or other ink materials onto a fabric, for example a knit material, where the material is adhered/bonded to the fabric and where the material does not generally delaminate when flexed, rolled, worked, or subject to additional assembly processes/steps. Other possible ink materials may include, for example, polyurethane, polyethylene, eutectic materials, molding clay, silicone, and other materials, including heat-curable, UV-curable, and photo-curable materials. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam.

Although some embodiments may use printing device 102 to print structures directly onto the surface of a material, other embodiments may include steps of printing a structure onto a platform or release paper, and then joining the printed structure to an article in a separate step. In other words, in at least some embodiments, printed structures need not be printed directly to the surface of an article.

Printing system 100 may be operated as follows to provide one or more structures that have been formed using a 3D printing process. CAD system 104 may be used to design a structure. This may be accomplished using CAD software or other kind of software. The design may then be transformed into information that can be interpreted by printing device 102 (or a related print server in communication with printing device 102). In some cases, the design may be converted to a 3D printable file, such as a stereolithography file (STL file).

Before printing, an article may be placed onto the top surface 148 of platform 112 within the housing 110 of printing device 102. Once the printing process is initiated (by a user, for example), printing device 102 may begin depositing material onto the article. This may be accomplished by moving nozzle 118 (using printing nozzle assembly 116) to build up layers of a structure using deposited material. In embodiments where fused filament fabrication is used, material extruded from nozzle 118 may be heated so as to increase the pliability of the printable material as it is deposited.

Although some of the embodiments shown in the figures depict a system using filament-fused fabrication printing technologies, it will be understood that still other embodiments could incorporate one or more different 3D printing technologies. For example, printing system 100 may use a tack and drag printing method. Moreover, still other embodiments could incorporate a combination of filament-fused fabrication and another type of 3D printing technique to achieve desired results for a particular printed structure or part.

As previously noted, printing device 102 may be configured to print directly onto various articles. Similarly, printing device 102 may be configured to print on various surface topographies. For example, as shown in FIG. 1, platform 112 is substantially planar. In other embodiments, platform 112 may include one or more protrusions and/or one or more cavities. Moreover, printing device 102 may print on surfaces having various shapes. For example, as shown, platform 112 is generally rectangular. In other embodiments, platform 112 may be circular, triangular, shaped like an upper for an article of footwear, etc. As shown, platform 112 has a top surface 148 configured to receive exemplary articles 130 (such as article of apparel 132 or upper for an article of footwear 134) that will have segmented tunnels printed upon them, as described below.

The segmented tunnels may be printed on exemplary articles 130 using printable materials. The term "printable material" is intended to encompass any materials that may be printed, ejected, emitted, or otherwise deposited during an additive manufacturing process. Such materials can include, but are not limited to, thermoplastics (e.g., PLA and ABS) and thermoplastic powders, high-density polyurethylene, eutectic metals, rubber, modeling clay, plasticine, RTV silicone, porcelain, metal clay, ceramic materials, plaster, and photopolymers, as well as possibly other materials known for use in 3D printing.

In some embodiments, a printable material may be any material that is substantially moldable and/or pliable above a predetermined temperature, such as a glass-transition temperature and/or a melting temperature. In one embodiment, a printable material has one or more thermal properties such as a glass-liquid transition ("glass transition") temperature and/or a melting temperature. For example, the printable material may be a thermoplastic material having a glass-transition temperature and a melting temperature. As used herein, thermoplastic materials may include, for example, acrylic, nylon, polybenzimidazole, polyethylene, polypropylene, polystyrene, polyvinyl chloride, polytetrafluoroethylene (PTFE), and the like.

Segmented tubular structures may be used on articles of footwear, articles of apparel, or on other articles of manufacture to route tensile strands that may be pulled tight to alter the configuration of the article. Examples of such tensile strands include cables, cords, laces, and strings. The use of such segmented tubular structures may allow a wearer or user of the article to modify the configuration of the article in a controlled manner by applying tensile stress to the tensile strands.

The segmented tubular structures are generally printed on or otherwise attached to a base layer of the article of footwear, article of apparel, or other article of manufacture. The base layer may be, for example, a fabric layer, textile layer, woven layer, knit layer, nonwoven layer, natural leather layer, synthetic layer, plastic layer, or thermoplastic layer.

Figure 3:
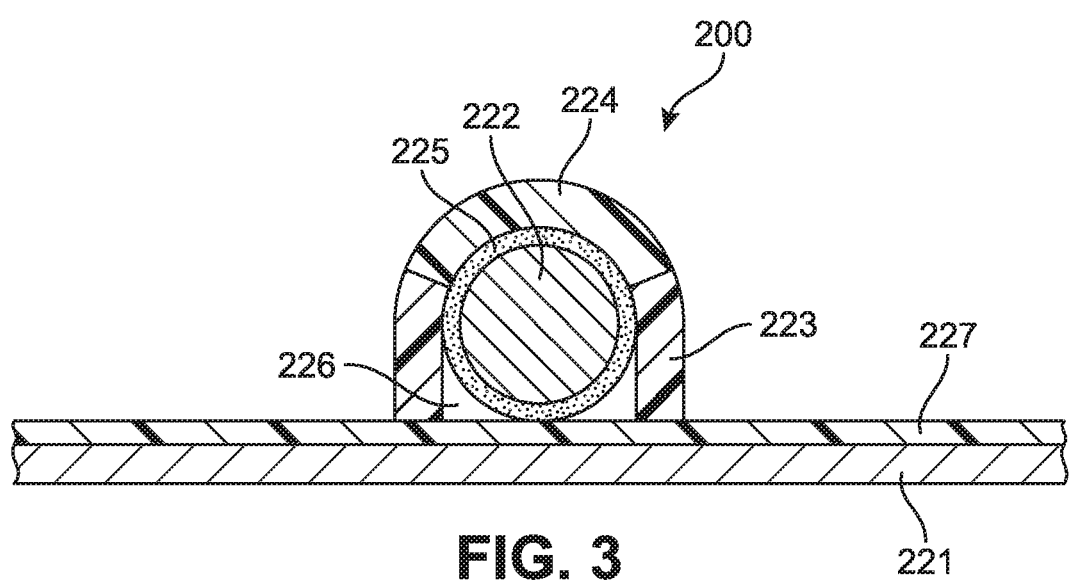
FIG. 3 is a schematic diagram of a cross section of an embodiment of a tubular structure.

FIG. 2 and FIG. 3 are schematic diagrams illustrating two of the techniques that may be used to print segmented tubular structures on articles of manufacture. To produce tubular structure 200 shown in cross section in FIG. 2, a section of tensile strand 202 is placed on base layer 201 of an article. For convenience, the term "tensile strand" is used herein to designate any tensile strand including a cable, cord, lace, string, or other tensile strand. A layer 203 of printable material is then printed over directly onto base layer 201 and over tensile strand 202. Optionally, in some embodiments, tensile strand 202 is encased in a coating 205, such as a PTFE coating, that allows tensile strand 202 to be pulled or pushed smoothly through tunnel 206 formed by layer 203 of printable material with minimal resistance.

To produce the tubular structure shown in the cross section in FIG. 3, a layer 227 of printable material may first be printed onto base layer 221 of an article. Layer 227 is optional, and may be omitted in appropriate cases, as described below. Walls 223 are then printed on layer 227 (or if layer 227 is omitted, on base layer 221), and tensile strand 222 is then placed within walls 223 and on top of layer 227. The tubular structure is then capped by printing curved section 224 over the top of tensile strand 222 and over the top of walls 223. Optionally, in some embodiments, tensile strand 222 is encased in a coating 225, such as a PTFE coating, that allows tensile strand 222 to be pulled or pushed smoothly through tunnel 226 formed by layer 223 of printable material.

A layer such as layer 227 (shown in FIG. 3) may also be used to produce a tubular structure such as the tubular structure shown in FIG. 2 by printing a layer of printable material onto the surface of the article prior to placing a tensile strand on the article. Use of a layer such as layer 227 may improve the adhesion of the tubular structure (FIG. 2) or the tunnel walls (FIG. 3). Thus, in cases where the printable material penetrates into the fabric of the article that is being printed upon and/or exhibits firm adhesion to the article, a layer such as layer 227 may be omitted. In other cases, where the adhesion of the walls of the tunnel themselves to the article may not be sufficient to prevent the possible separation of the tunnel segment to the article, printing a layer such as layer 227 may be an effective way of improving the attachment of the tunnel segment to the article.

Figure 4:
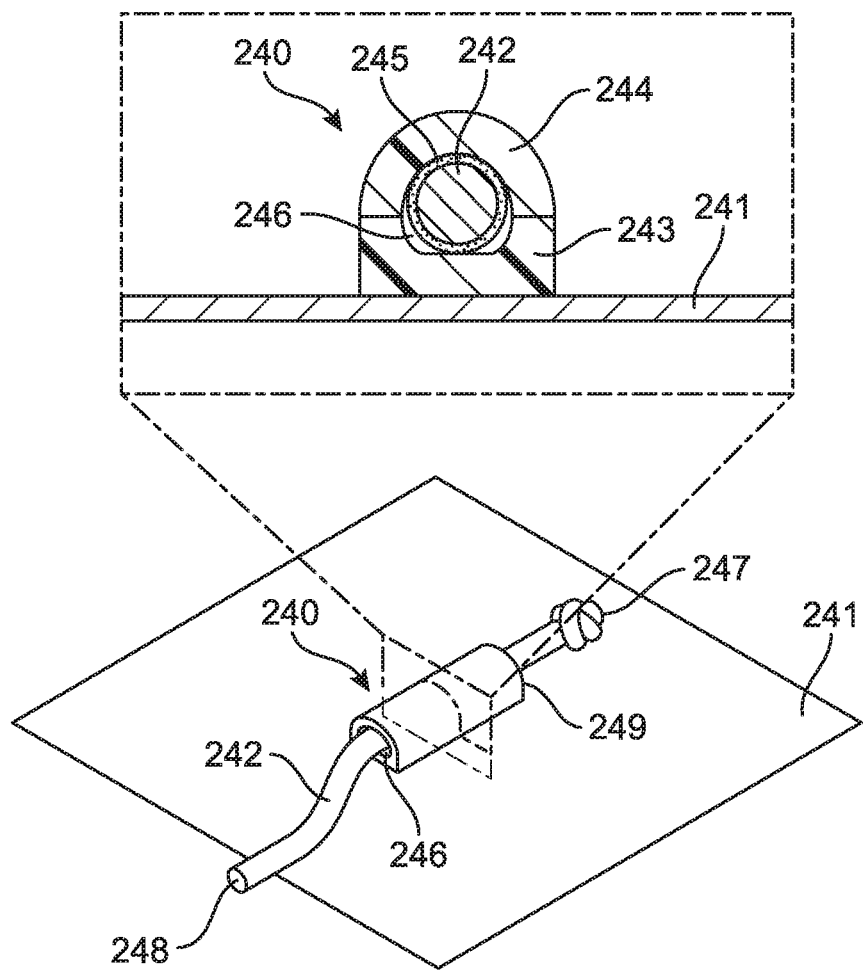
FIG. 4 is a schematic diagram of a cross section of an embodiment of a tubular structure on a base layer.

FIG. 4 is a schematic diagram of a perspective view of an embodiment of a segment of a tubular structure 240 on a section of a base layer 241. Base layer 241 may be a fabric, such as the fabric used for an upper of an article of footwear or the fabric used for an article of apparel. In this embodiment, the lower portion 243 of tubular structure 240 is printed first on base layer 241. Tensile strand 242 is then placed within the lower portion 243 of tubular structure 240, and the upper portion 244 of tubular structure 240 is then printed over the lower portion 243 and over tensile strand 242, thus producing the tubular structure 240 shown in FIG. 4. Tensile strand 242 has catching element 247, which is illustrated in FIG. 4 as a knot, at one end. Catching element 247 prevents tensile strand 242 from passing entirely through tunnel 246 in tubular structure 240. Thus when end 248 of tensile strand 242 is pulled, tensile strand 242 is pulled through tunnel 246 in tubular structure 240 until catching element 247 abuts end 249 of tubular structure 240.

The opposite end 248 of tensile strand 242 may then be laced through one or more additional tunnel segments, as illustrated in FIGS. 7-10, which are described below.

Thus, in the embodiment of a tubular structure illustrated in FIG. 4, tensile strand 242 is completely encased by the printable tubular structure formed by printing layers of printable material on base layer 241 and over tensile strand 242, unlike the embodiment shown in FIG. 2, in which tensile strand 242 is in direct contact with the base layer 201 of an article. The embodiment illustrated schematically in FIG. 4 is also different from the structure of the embodiment illustrated in FIG. 2, because the FIG. 4 embodiment does not have a layer such as layer 227 that extends over the article beyond the periphery of the tunnel segment itself.

Optionally, in the embodiment illustrated in FIG. 4, tensile strand 242 may be coated with layer 245 of a material such as PTFE, which may allow tensile strand 242 to slip easily through tunnel 246 in tubular structure 240.

Figure 5:
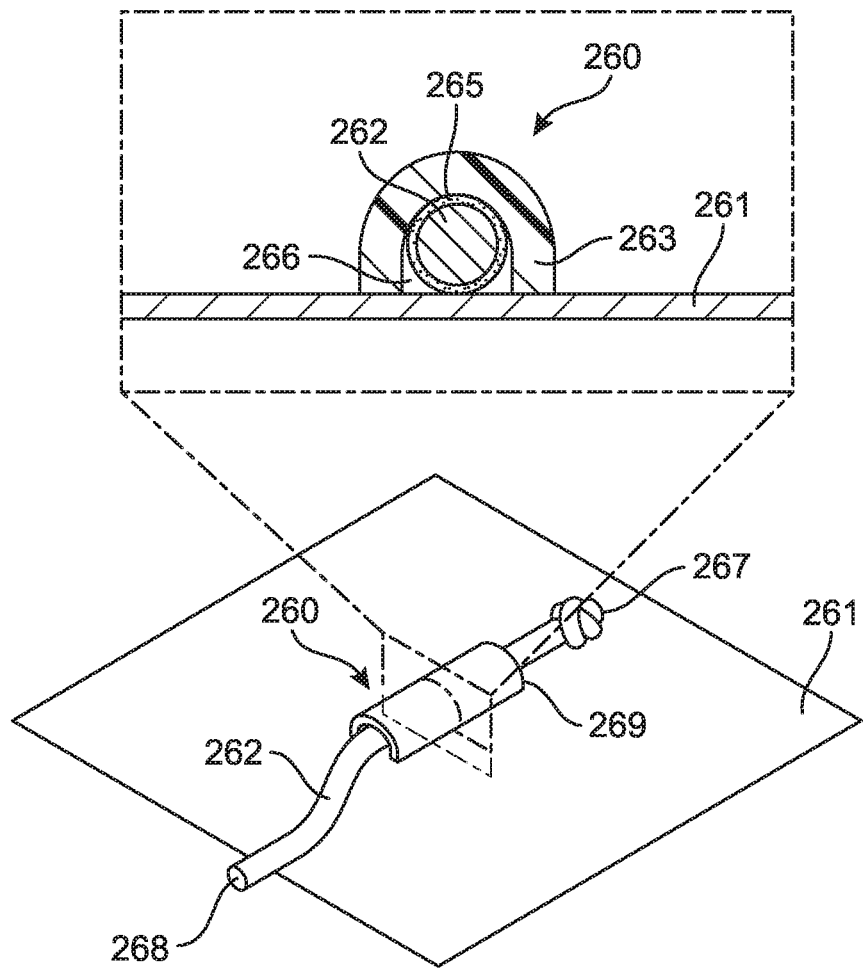
FIG. 5 is a schematic diagram of a cross section of an embodiment of a tubular structure on a base layer.

FIG. 5 is a schematic illustration of a perspective view of an embodiment of tubular structure 260 fabricated by the method described above with respect to FIG. 2, as it has been applied to a section of base layer 261. The cross section shows tensile strand 262 directly on the top surface of base layer 261, with optional coating 265 of a material such as PTFE, which allows tensile strand 262 to slip readily through tunnel 266 with minimal resistance from the inner surface of wall 263 of tubular structure 260. Thus when end 268 of tensile strand 262 is pulled, tensile strand 262 is pulled through tunnel 266 until catching element 267 abuts end 269 of tubular structure 260.

The tubular structures illustrated schematically in FIG. 4 and FIG. 5 may be applied sequentially to form collapsible tunnel systems. By collapsing two or more tubular structures, as illustrated in FIGS. 6-10, portions of a relatively flexible or bendable structure may be changed, for example, to a more rigid and less bendable structure and/or to have a different configuration or geometry.

Figure 6:
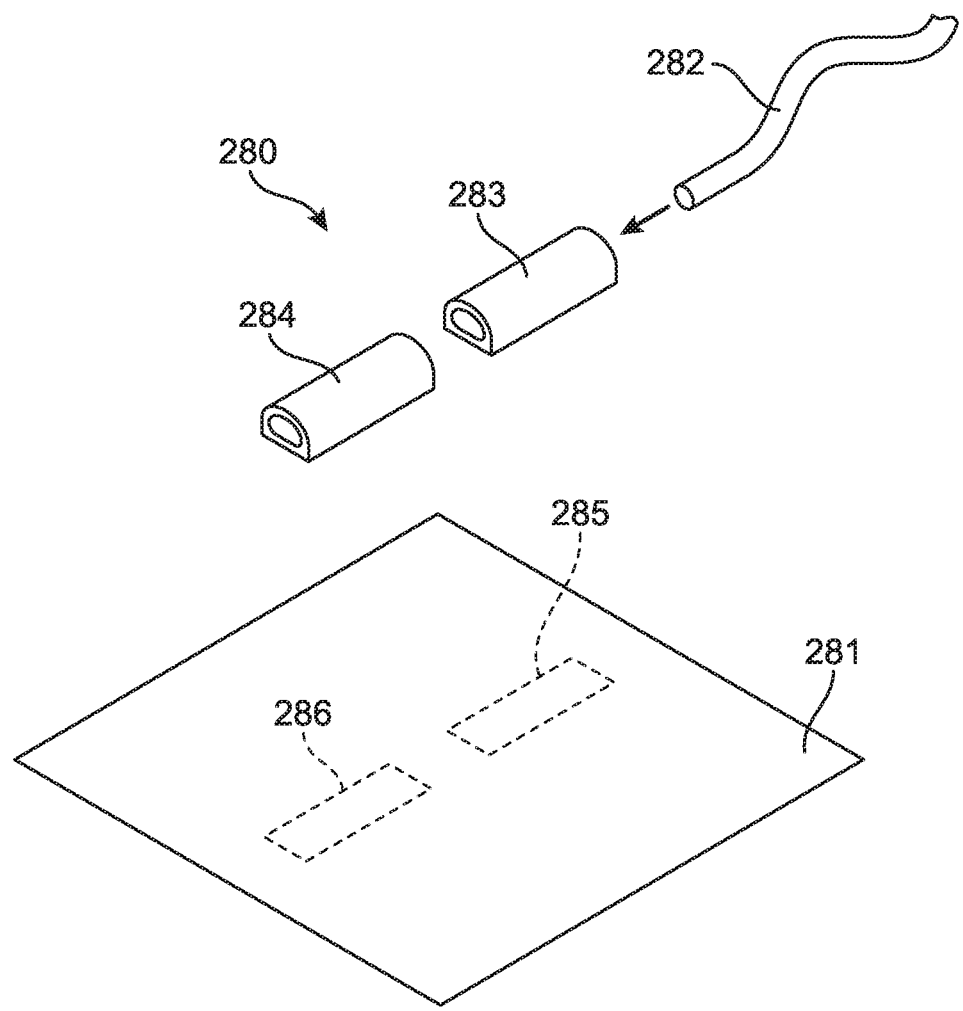
FIG. 6 is a schematic diagram of an exploded view of an embodiment of a collapsible tunnel system over a base layer.

FIGS. 6-9 illustrate the structure and operation of an exemplary collapsible tunnel system comprised of two linear tubular structures. FIG. 6 is a schematic diagram of an exploded view of a section of base layer 281 with a collapsible tunnel system 280 that includes first tubular structure 283, second tubular structure 284, and tensile strand 282. FIG. 6 shows that tensile strand 282 may be laced through two sequential tubular structures, first tubular structure 283 and second tubular structure 284, to form a segmented structure of collapsible tunnel system 280. Dashed outline 285 shows the position of first tubular structure 283 on base layer 281, and dashed outline 286 shows the position of second tubular structure 284 on base layer 281.

Figure 7:
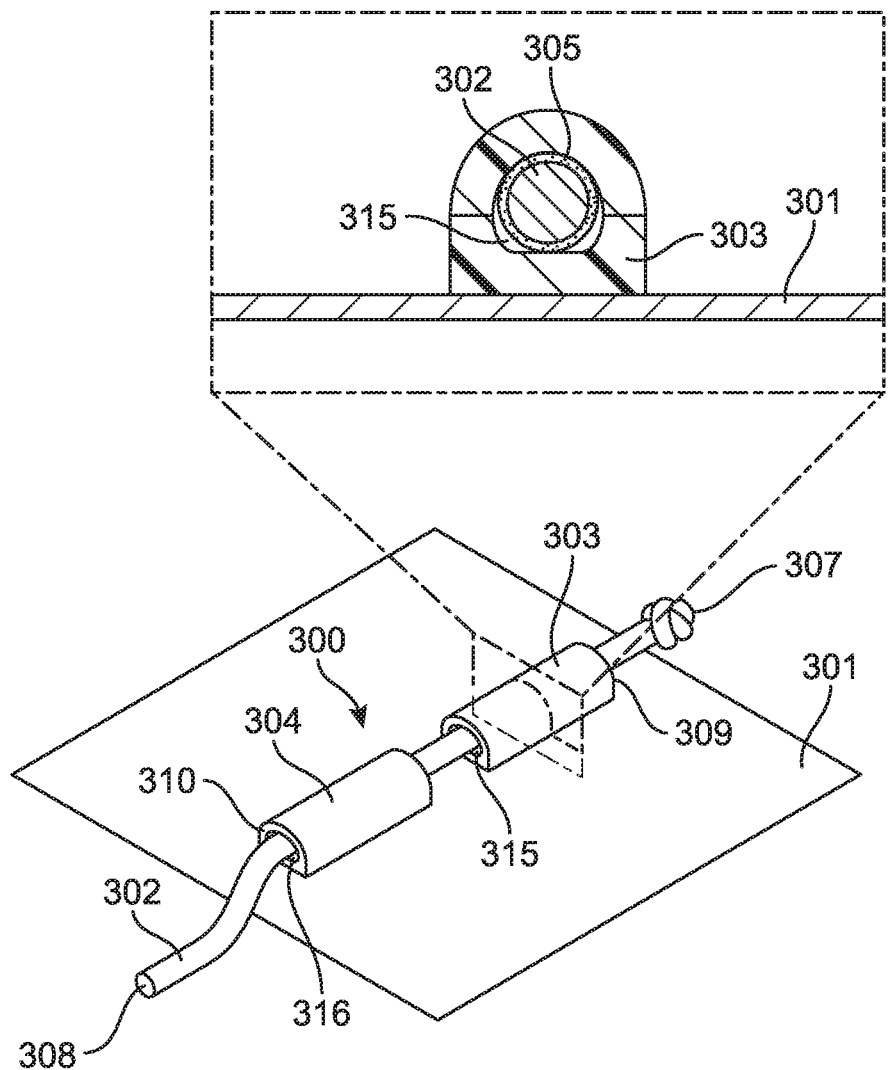
FIG. 7 is a schematic diagram of the collapsible tunnel system of FIG. 6 in its unstressed configuration.

FIG. 7 is a schematic diagram of a perspective view of an example of the embodiment of FIG. 6 as it is applied to a section of base layer 301. In this configuration, collapsible tunnel system 300 has first tubular structure 303 and second tubular structure 304 that are spaced apart from each other in this first configuration. First tubular structure 303 encloses first tunnel 315, and tubular structure 304 encloses second tunnel 316. Tensile strand 302 may be inserted into one back end 309 of first tubular structure 303 and laced through first tunnel 315 in first tubular structure 303 and through second tunnel 316 in second tubular structure 304 and out of the front end 310 of second tubular structure 304. Tensile strand 302 has a catching element 307 at one end, such that when tensile strand end 308 is pulled, first tubular structure 303 is forced toward second tubular structure 304. As shown in the cross section of first tubular structure 303, first tubular structure 303 completely encloses tensile strand 302 within first tunnel 315 in first tubular structure 303. Similarly, second tubular structure 304 completely encloses tensile strand 302 within second tunnel 316. However, in other embodiments, the structure illustrated in FIG. 5 may be used, such that the tensile strand is in direct contact with the underlying base layer.

Figure 8:
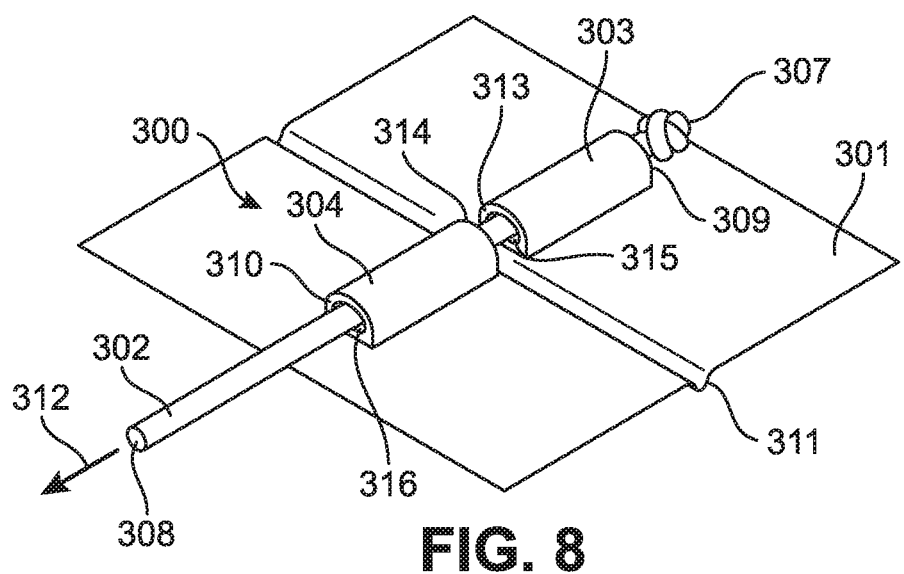
FIG. 8 is a schematic diagram of the collapsible tunnel system of FIG. 6 in a partially collapsed configuration.

FIG. 8 is a schematic diagram of the collapsible tunnel system 300 of FIG. 7 on base layer 301, as tensile strand 302 is pulled at its tensile strand end 308 in the direction indicated by arrow 312. Tensile strand 302 is laced through a back end 309 of first tubular structure 303, through first tunnel 315 in first tubular structure 303 and out of its front end 313. Tensile strand 302 is then laced into the back end 314 of second tubular structure 304 through second tunnel 316 of second tubular structure 304 and out of its front end 310. First Tubular structure 303 and second tubular structure 304 have been brought closer together, by first pulling on tensile strand 302 at tensile strand end 308 in the direction indicated by arrow 312 until catching element 307 (illustrated as a knot in FIG. 8) is forced against back end 309 of first tubular structure 303, and then pulling tensile strand 302 further such that front end 313 of first tubular structure 303 comes closer to back end 314 of second tubular structure 304. In this embodiment, the underlying base layer 301 now has a fold 311 below collapsible tunnel system 300, because the base layer has been pulled forward when first tubular structure 303 has been pulled forward as tensile strand 302 has been pulled forward.

Figure 9:
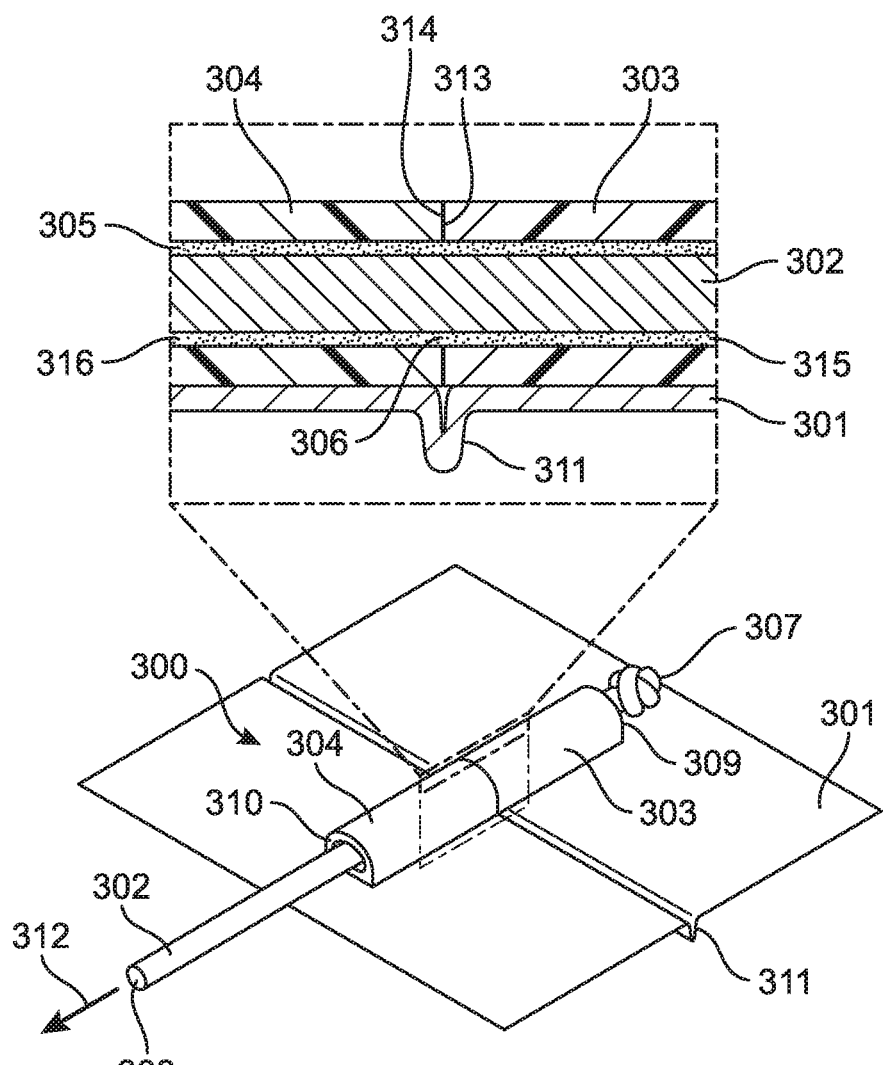
FIG. 9 is a schematic diagram of the collapsible tunnel system of FIG. 6 in a fully collapsed configuration.

FIG. 9 is a schematic diagram of a perspective view with a longitudinal cross section of the embodiment of collapsible tunnel system 300 of FIG. 7 and FIG. 8, showing the configuration of the fully collapsed collapsible tunnel system 300 after tensile strand 302 (shown with an optional PTFE coating 305) has been pulled fully forward through back end 309 of tubular structure 303 such that catching element 307 is forced against back end 309. Tensile strand 302 has also been pulled through first tunnel 315 and front end 313 of first tubular structure 303, then through back end 314 of second tubular structure 304, second tunnel 316, and front end 310 of second tubular structure 304 in the direction shown by arrow 312. In this configuration, front end 313 of first tubular structure 303 abuts back end 314 of second tubular structure 304, and fold 311 in underlying base layer 301 is essentially closed up, as shown in the cross section above the perspective view. FIG. 9 shows that, when fully collapsed, collapsible tunnel system 300 has a continuous tunnel 306 extending though first tubular structure 303 and second tubular structure 304, because first tunnel 315 in first tubular structure 303 and second tunnel 316 in second tubular structure 304 have merged to form a single continuous tunnel 306 through collapsible tunnel system 300.

Figure 10:
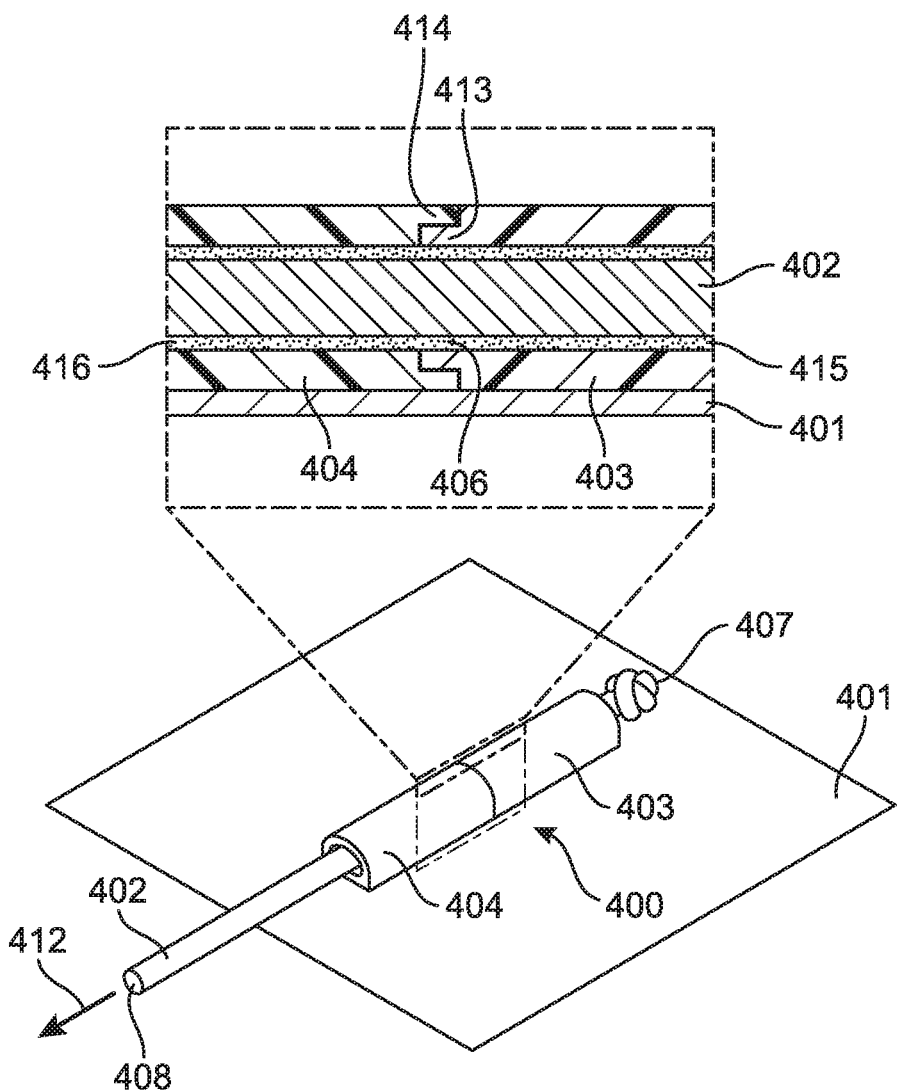
FIG. 10 is a schematic diagram of an embodiment of a collapsible tunnel system in a fully collapsed configuration.

FIG. 10 is a schematic diagram of an alternative embodiment of collapsible tunnel system 400 on base layer 401. In this embodiment, front end 413 of tubular structure 403 is configured to fit into back end 414 of tubular structure 404, as shown in the longitudinal cross section, as tensile strand 402 (shown without the optional PTFE coating) is pulled forward through tunnel 415 in tubular structure 403 and tunnel 416 in tubular structure 404 in the direction indicated by arrow 412 at front end 408 of tensile strand 402. As in the embodiment of FIG. 9, tensile strand 402 has a catching element 407 at the back end of tensile strand 402, which may be used to force tubular structure 403 into close engagement with tubular structure 404. Tunnel 415 in tubular structure 403 and tunnel 416 in tubular structure 404 have merged, to form a single tunnel 406 through collapsible tunnel system 400. In this embodiment, base layer 401 is an elastic material that can absorb the change in its longitudinal dimension without producing a fold, as in the embodiment of FIG. 10.

For clarity, the examples of embodiments illustrated in FIGS. 6-10 only show two sequential tubular structures. However, in general, embodiments may have two, three, four, or more sequential tubular structures that form a collapsible tunnel system. Moreover, although the tubular structures are depicted in the figures as being linear cylinders, in general they may be curved or bent, and may have other shapes. Also, the tubular structures may have any appropriate geometries or dimensions. For example, the tubular structures may be cylindrical, or may have square, oval, or rectangular cross sections, and may have any appropriate range of outer diameter, inner diameter, wall thickness, or length.

The examples of collapsible tunnel systems illustrated in FIGS. 6-10 are shown as having linear tubular structures. However, these embodiments do not necessarily have to use linear structures—depending on the particular application, curved tubular structures or angled tubular structures may alternatively be used. For example, a curved tubular structure may be used around the back of a heel or along the side of the midfoot or forefoot in an article of footwear. In other embodiments, more complex systems using nonlinear tubular structures may be used, as described below.

Figure 11:
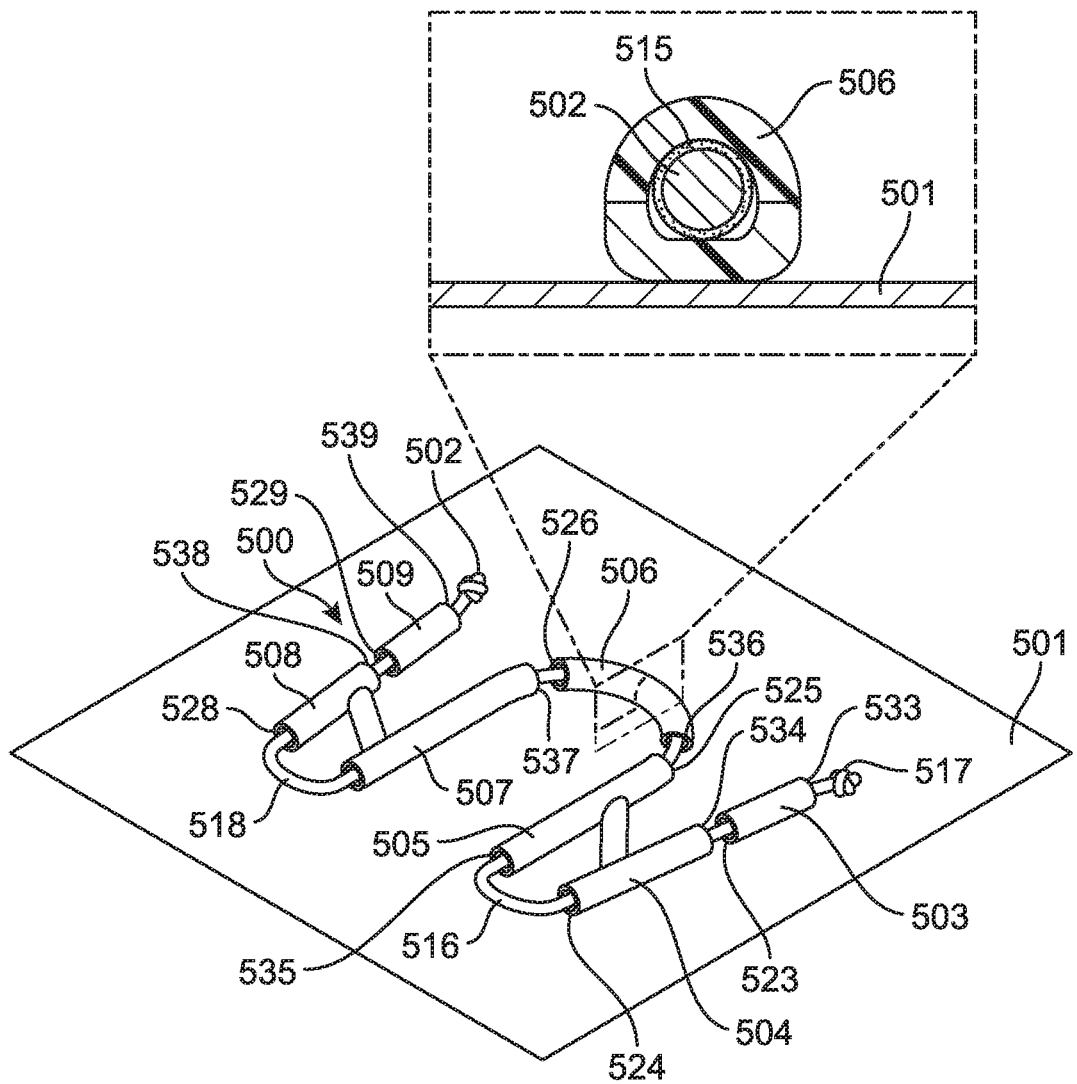
FIG. 11 is a schematic diagram of an embodiment of a nonlinear collapsible tunnel system in its unstressed configuration.
Figure 12:
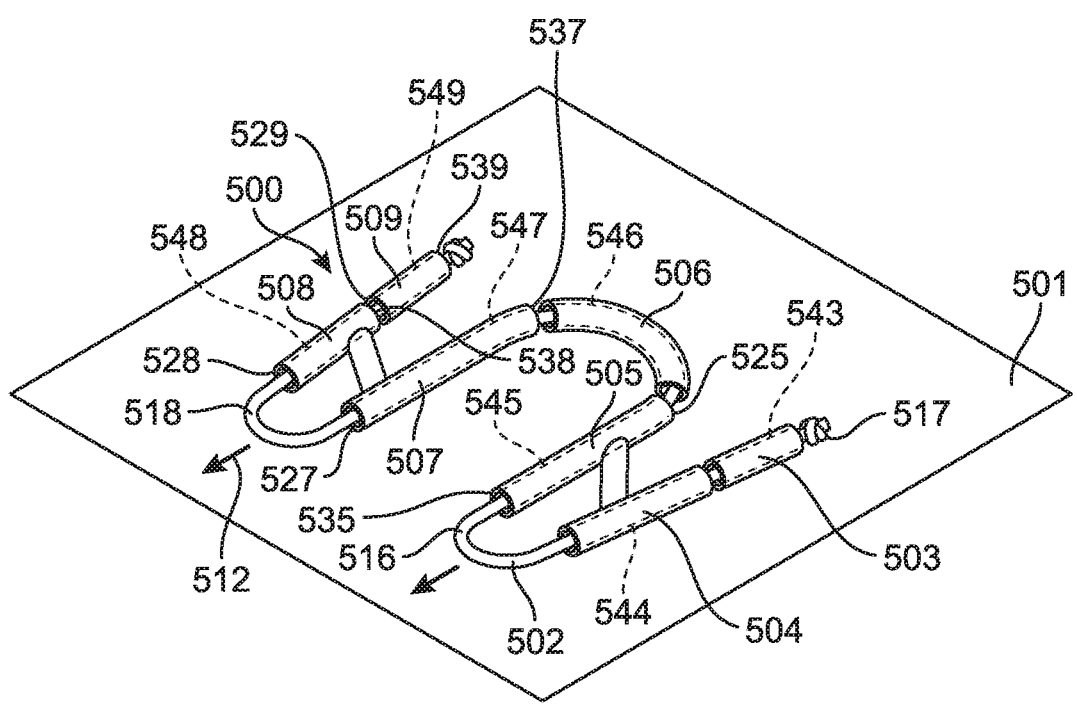
FIG. 12 is a schematic diagram of the embodiment of a nonlinear collapsible tunnel system of FIG. 11 in a partially collapsed configuration.
Figure 13:
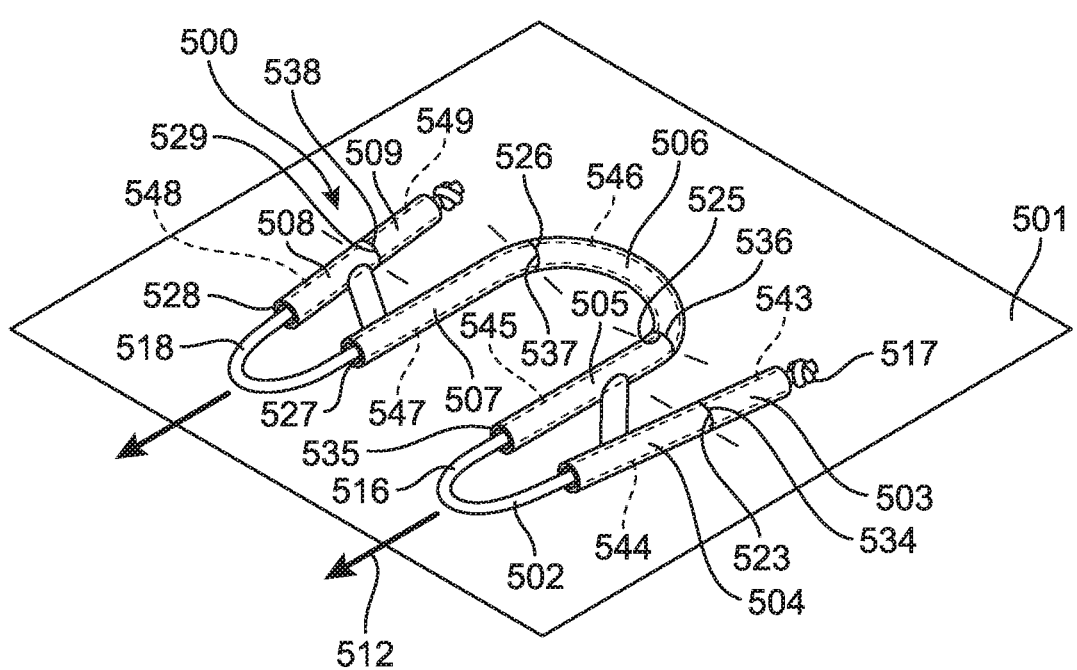
FIG. 13 is a schematic diagram of the embodiment of the nonlinear collapsible tunnel system of FIG. 11 in a fully collapsed configuration.

FIGS. 11-13 are schematic diagrams that illustrate the structure and operation of an embodiment of an exemplary nonlinear collapsible tunnel system 500 on a section of base layer 501. In this embodiment, which is shown prior to any application of tension in FIG. 11, exemplary nonlinear collapsible tunnel system 500 includes linear tubular structures such as linear tubular structure 503, linear tubular structure 504, linear tubular structure 505, linear tubular structure 507, linear tubular structure 508, and linear tubular structure 509. This embodiment also includes a curved tubular structure 506. The tubular structures in this embodiment may be fabricated using any of the processes described above with reference to FIGS. 2-4, or by another suitable process. Tensile strand 502 is laced through each of linear tubular structure 503, linear tubular structure 504, linear tubular structure 505, curved tubular structure 506, linear tubular structure 507, linear tubular structure 508, and linear tubular structure 509. Tensile strand 502 has catching elements 517 at both ends. Also, although in this example tensile strand 502 is shown in the cross section as having a PTFE coating 515, that coating is not necessarily present in all implementations of this embodiment.

Exemplary nonlinear collapsible tunnel system 500 is shown in a first configuration on base layer 501 in FIG. 1 when it is in a relaxed state and not under tension, for example prior to tension being applied to tensile strand 502. In this relaxed state, the various linear tubular structures or curved tubular structures spaced apart from each other. Specifically, in the first configuration shown in FIG. 11, curved tubular structure 506 has one end portion 526 at one end and another end portion 536 at its opposite end. As shown in FIG. 12 and FIG. 13, curved tubular structure 506 also has tunnel 546 that extends from end portion 526 through curved tubular structure 506 to end portion 536. Similarly, as also shown in FIG. 12 and FIG. 13, linear tubular structure 505 has an end portion 525 at one end, another end portion 535 at its opposite end and tunnel 545 (see FIGS. 12 and 13) extending through linear tubular structure 505 from end portion 525 to end portion 535.

Similarly, linear tubular structure 503 has end portion 523 at one end, end portion 533 at its opposite end, and tunnel 543 (see FIGS. 12 and 13) extending from end portion 523 to end portion 533; linear tubular structure 504 has end portion 524 at one end, end portion 534 at its opposite end, and tunnel 544 (see FIGS. 12 and 13) extending from end portion 524 to end portion 534; linear tubular structure 507 has end portion 527 at one end, end portion 537 at its opposite end, and tunnel 547 (see FIGS. 12 and 13) extending from end portion 527 to end portion 537; linear tubular structure 508 has end portion 528 at one end, end portion 538 at its opposite end, and tunnel 548 (see FIGS. 12 and 13) extending from end portion 528 to end portion 538; and linear tubular structure 509 has end portion 529 at one end, end portion 539 at its opposite end, and tunnel 549 (see FIGS. 12 and 13) extending from end portion 529 to end portion 539.

Tensile strand 502 is laced through tunnel 543, tunnel 544, tunnel 545, tunnel 546, tunnel 547, tunnel 548, and tunnel 549. Tensile strand 502 has a catching element 517 at each end. In an exemplary embodiment, at least two of linear tubular structure 504, linear tubular structure 505, linear tubular structure 507, and linear tubular structure 508 may be anchored to the base layer or anchored to some other structure, such that when loop 516 and loop 518 in tensile strand 502 are pulled in the direction indicated by arrows 512 in FIG. 12, linear tubular structure 503 is forced toward linear tubular structure 504; linear tubular structure 509 is forced toward linear tubular structure 508; and curved tubular structure 506 is forced toward linear tubular structure 505 and linear tubular structure 507. In one exemplary embodiment, all four of linear tubular structure 504, linear tubular structure 505, linear tubular structure 507, and linear tubular structure 508 may be anchored to base layer 501 or to another structure. In another embodiment, linear tubular structure 504 and linear tubular structure 507 may be anchored, and in yet another embodiment, linear tubular structure 504 and linear tubular structure 508 may be anchored.

Thus FIG. 12 shows nonlinear collapsible tunnel system 500 at an intermediate stage, after tension has been applied by pulling on loop 516 and loop 518 in the direction shown by arrows 512, but before the tunnel structures have fully collapsed. Thus, as tension is applied to tensile strand 502 by pulling on loops 516, catching elements 517 push linear tubular structure 503 against linear tubular structure 504 and linear tubular structure 509 against linear tubular structure 508, as shown in FIG. 12. Curved tubular structure 506 has been pushed closer to linear tubular structure 505 and linear tubular structure 507.

FIG. 13 is a schematic diagram illustrating the final configuration of nonlinear collapsible tunnel system 500, after the system has been fully collapsed by pulling on loop 516 and loop 518. As shown in FIG. 13, in this configuration, end portion 536 of curved tubular structure 506 abuts against end portion 525 of linear tubular structure 505, and end portion 526 of curved tubular structure 506 abuts against end portion 537 of linear tubular structure 507, such that tunnel 545 in linear tubular structure 505, tunnel 546 in curved tubular structure 506, and tunnel 547 in linear tubular structure 507 form a continuous tunnel.

In this final configuration, end portion 523 of linear tubular structure 503 abuts against end portion 534 of linear tubular structure 504, such that tunnel 543 and tunnel 544 also form a continuous tunnel. End portion 529 of linear tubular structure 509 abuts against end portion 538 of linear tubular structure 508, such that tunnel 549 and tunnel 548 also form a continuous tunnel.

The nonlinear collapsible system shown in FIGS. 11-13 may also be collapsed, for example, by pulling on the two ends of tensile strand 502 as the ends emerge from linear tubular structure 503 and linear tubular structure 509. In that case, linear tubular structure 503, curved tubular structure 506, and linear tubular structure 509 may need to be anchored such that linear tubular structure 504 is forced against linear tubular structure 503. Linear tubular structure 505 and linear tubular structure 507 are forced against curved tubular structure 506, and linear tubular structure 508 is forced against linear tubular structure 509.

Figure 24:
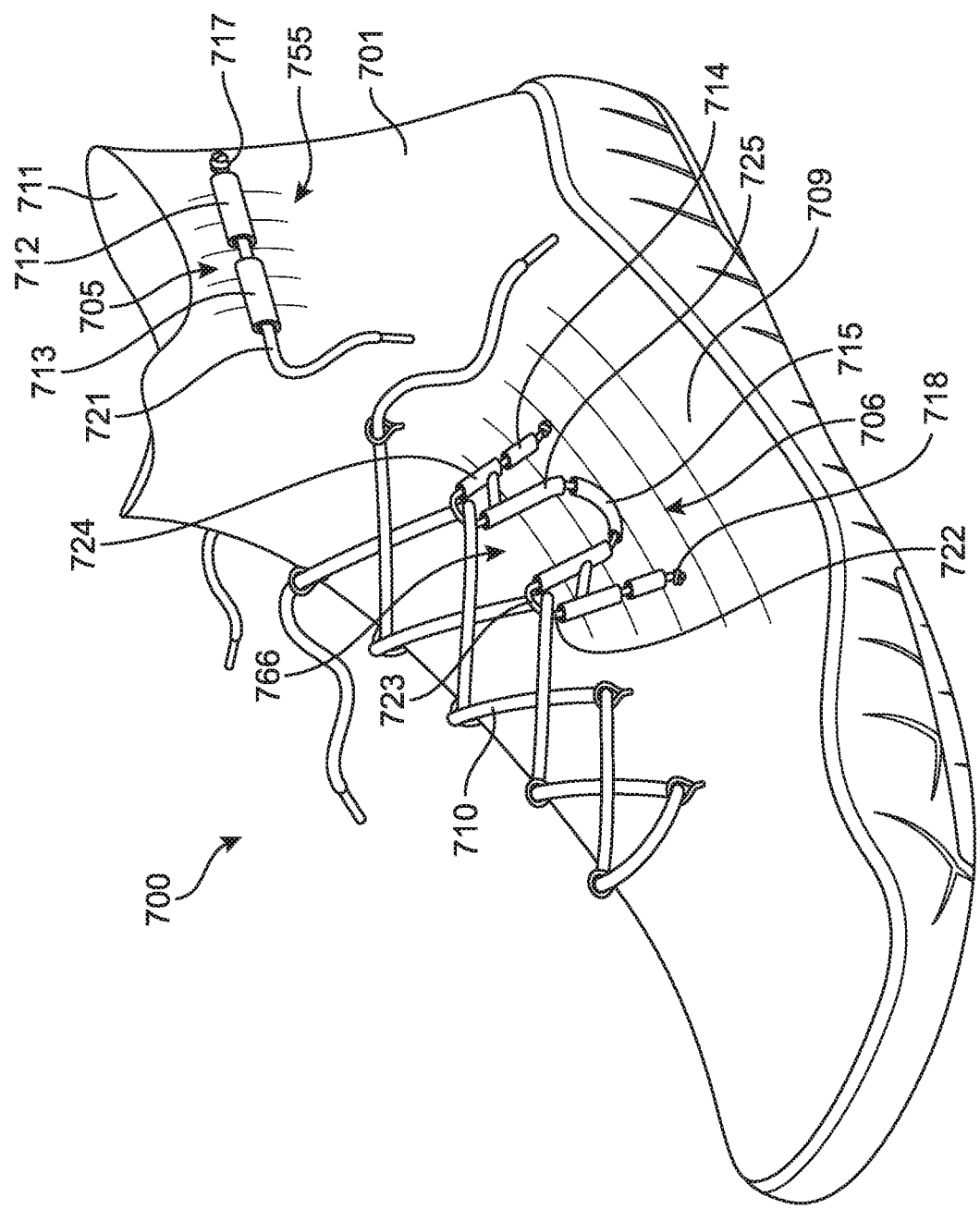
FIG. 24 is a schematic diagram of a perspective view of an exemplary article of footwear with embodiments of collapsible tunnel structures in their unstressed configuration.
Figure 25:
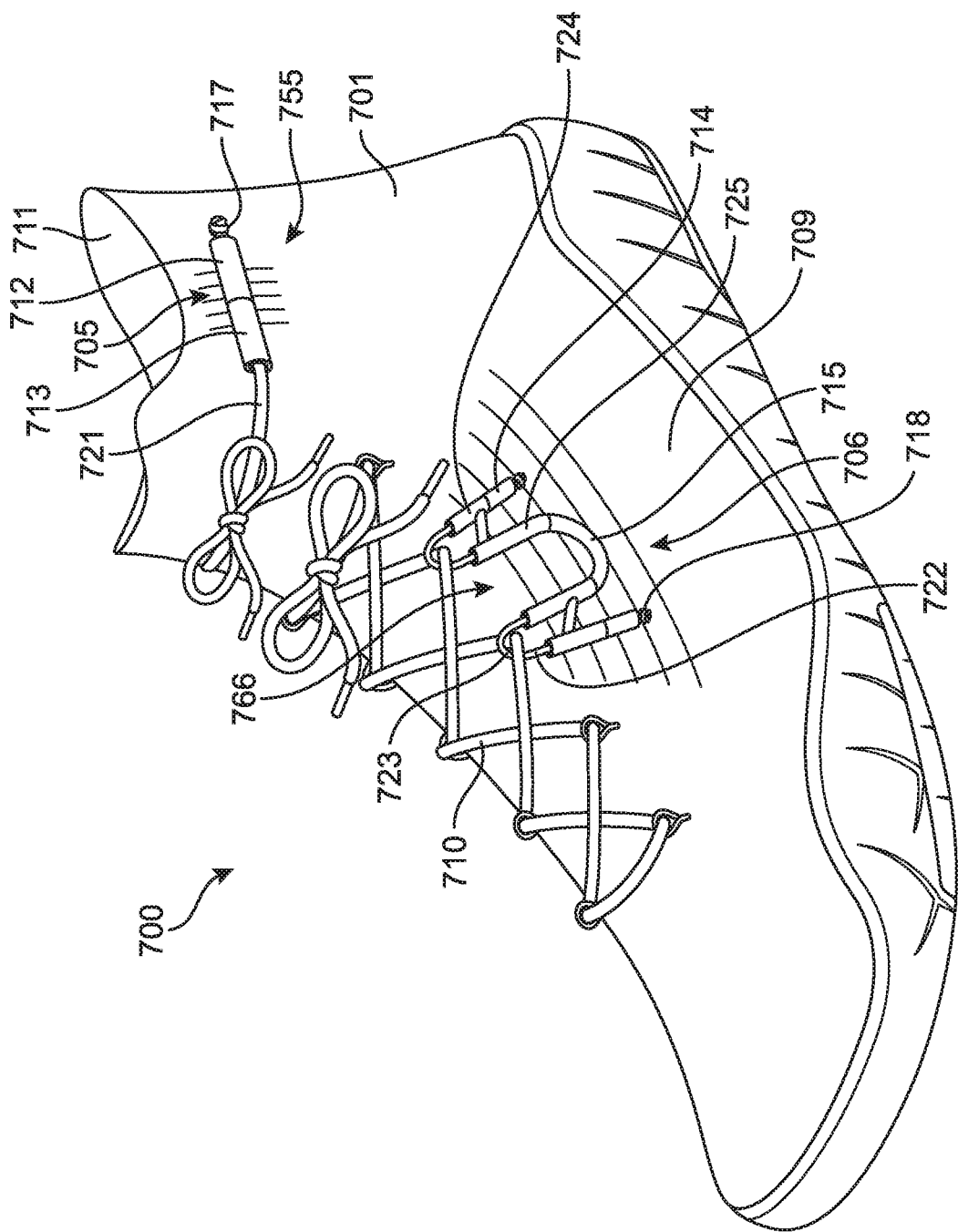
FIG. 25 is a schematic diagram of a perspective view of an exemplary article of footwear with embodiments of collapsible tunnel structures in their stressed configuration.

As an example, the nonlinear collapsible tunnel system 500 of FIGS. 11-13 may be placed on the lateral and/or medial side of an upper for an article of footwear, as illustrated in FIG. 24 and FIG. 25, which are described below. As described below, the lace of the article of footwear may be laced though loop 516 and loop 518 as well as through the eyelets on the side of the tongue opening, such that, when the laces are tightened, tension is applied to tensile strand 502, pulling loop 516 and loop 518 up toward the eyelets, and collapsing nonlinear collapsible tunnel system 500 into the fully collapsed configuration shown in FIG. 13.

Figure 14:
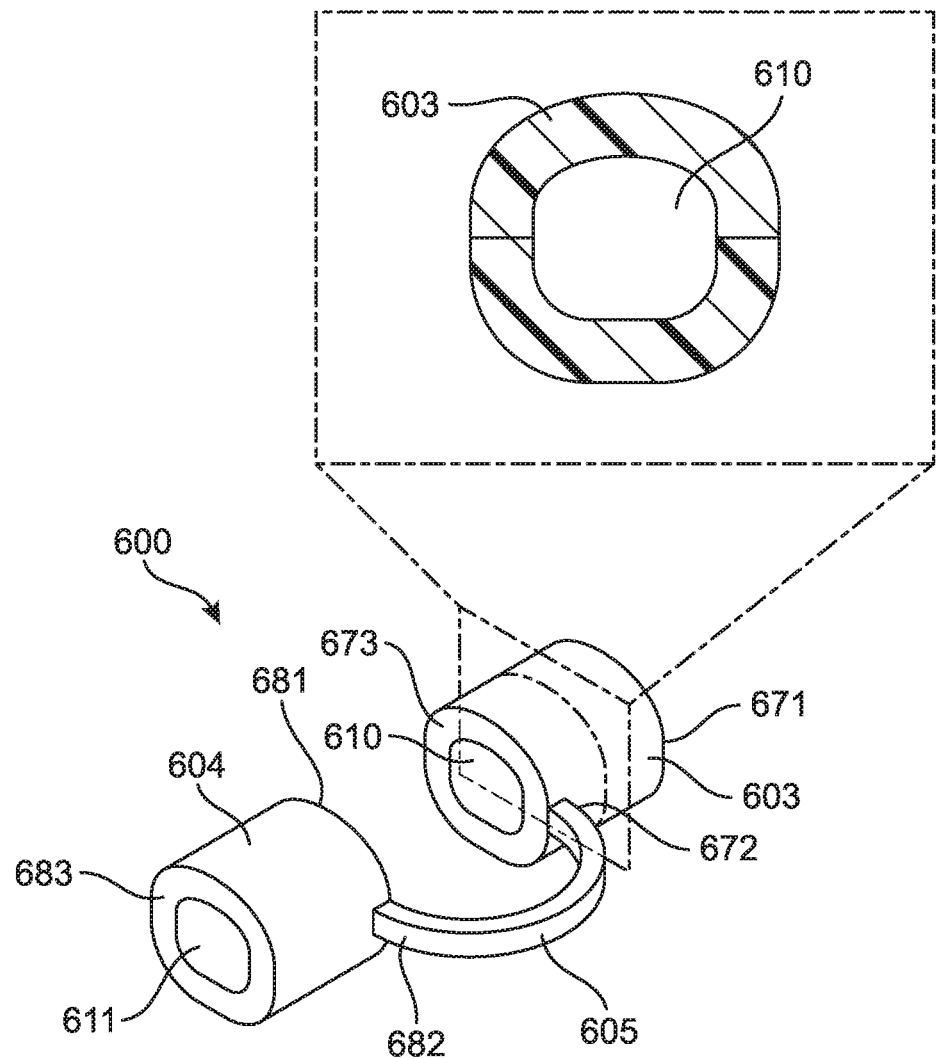
FIG. 14 is a schematic diagram of an embodiment of a segmented tunnel structure.

In other embodiments, some of which are illustrated in FIGS. 14-22, the tubular structures may be configured in pairs, with a connecting portion attaching each tubular structure to its paired tubular structure to form a segmented tunnel structure. For example, in the embodiment shown in a perspective view in FIG. 14, segmented tunnel structure 600 has a first tubular structure 603 with a tunnel 610 (best shown in the cross-sectional view within FIG. 14) extending from end 671 to end 673 of first tubular structure 603. It is attached to a second tubular structure 604 that has a tunnel 611 extending from end 681 to end 683 of second tubular structure 604 by a connecting portion 605. Connecting portion 605 is attached at one end 672 to first tubular structure 603 and at its other end 682 to second tubular structure 604. As shown in FIG. 14, in some embodiments, connecting portion 605 is in the shape of an arc prior to compression, but in other embodiments, connecting portion 605 may have other shapes, such as a combination of straight and/or curved sections.

In some embodiments, for example, when connecting portion 605 is in the shape of an arch (as illustrated in FIGS. 14-19), connecting portion 605 functions as a spring that resists contraction of the segmented tubular structure. This property may be used to control and shape the configuration of the underlying portion of an article of footwear, article of apparel, or other article of manufacture as the segmented tunnel structure is collapsed.

Figure 15:
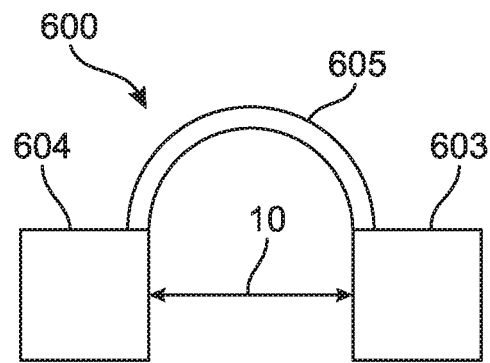
FIG. 15 is a schematic diagram of a plan view of the embodiment of FIG. 14 in its unstressed configuration.
Figure 16:
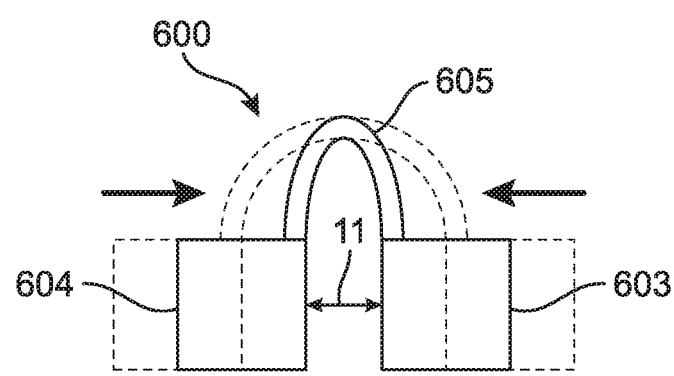
FIG. 16 is a schematic diagram of a plan view of the embodiment of FIG. 14 in a compressive stress configuration.

FIGS. 15 and 16 are plan views of the exemplary embodiment of FIG. 14, when the segmented tunnel structure 600 is not under compressive stress in FIG. 15, and when it is under compression in FIG. 16, as shown by the arrows in FIG. 16. In this example, first tubular structure 603 is spaced from second tubular structure 604 by a distance 10, and connecting portion 605 forms a generally semi-circular arch. When segmented tunnel structure 600 is under compression, as shown in FIG. 16, first tubular structure 603 is spaced from second tubular structure 604 by a distance 11, which is less than the distance 10, and connecting portion 605 forms a much narrower arch.

Figure 17:
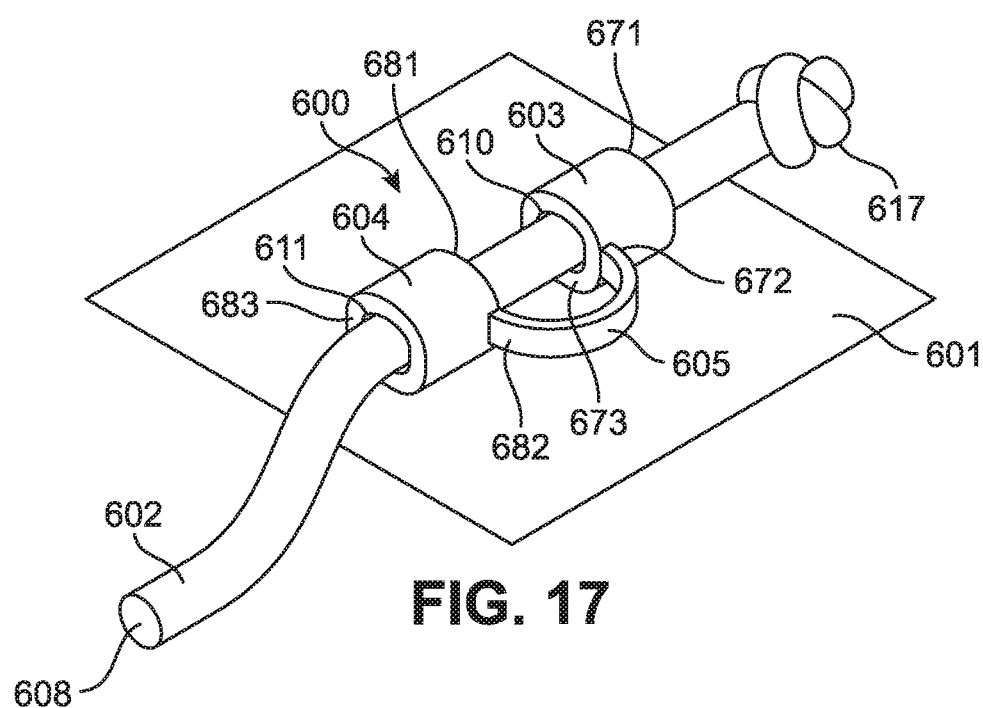
FIG. 17 is a schematic diagram of a perspective view of an embodiment of a segmented tunnel structure on a base layer and with a tensile strand laced through the segmented tunnel structure.
Figure 18:
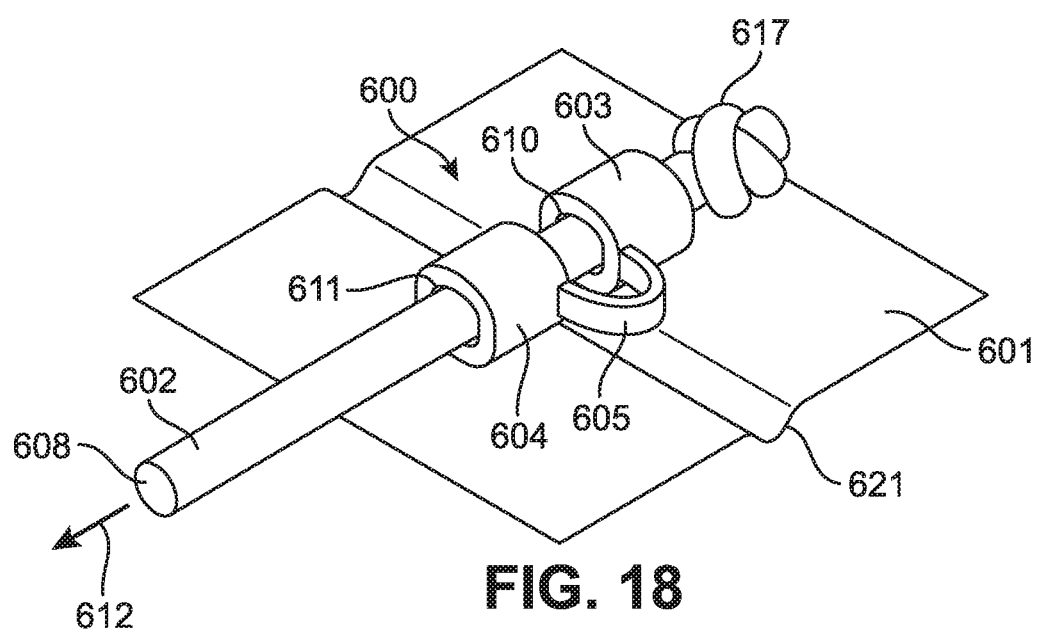
FIG. 18 is a schematic diagram of the embodiment of FIG. 17 in a partially collapsed configuration.
Figure 19:
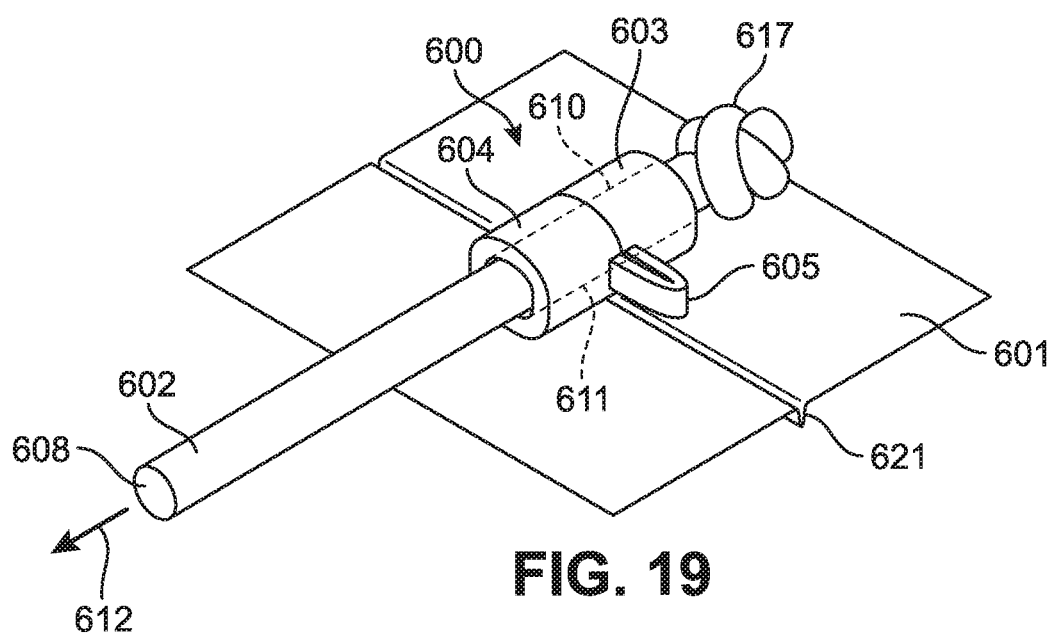
FIG. 19 is a schematic diagram of the embodiment of FIG. 17 in a fully collapsed configuration.

FIGS. 17-19 are schematic diagrams that illustrate the embodiment of FIGS. 14-16, as applied to a base layer 601, with a tensile strand 602 passing through tunnel 610 in first tubular structure 603 by connecting portion 605 and through tunnel 611 in second tubular structure 604. FIG. 17 shows the segmented tunnel structure 600 in an unstressed configuration on base layer 601. Tensile strand 602 has a catching element 617 (such as a knot) at one end, such that first tubular structure 603 may be forced closer to second tubular structure 604 or into contact with second tubular structure 604, when tensile strand 602 is pulled at end 608 in the direction shown by arrow 612 in FIG. 18. FIG. 18 shows the segmented tunnel structure of FIG. 17 when tensile strand 602 has been pulled such that catching element 617 is forcing first tubular structure 603 toward second tubular structure 604. In FIG. 19, first tubular structure 603 has been pulled into full contact with second tubular structure 604, such that tunnel 610 in first tubular structure 603 and tunnel 611 in second tubular structure 604 form a single continuous tunnel. Connecting portion 605 is folded against itself, and a fold 621 is formed in base layer 601, as shown in FIG. 19.

Figure 20:
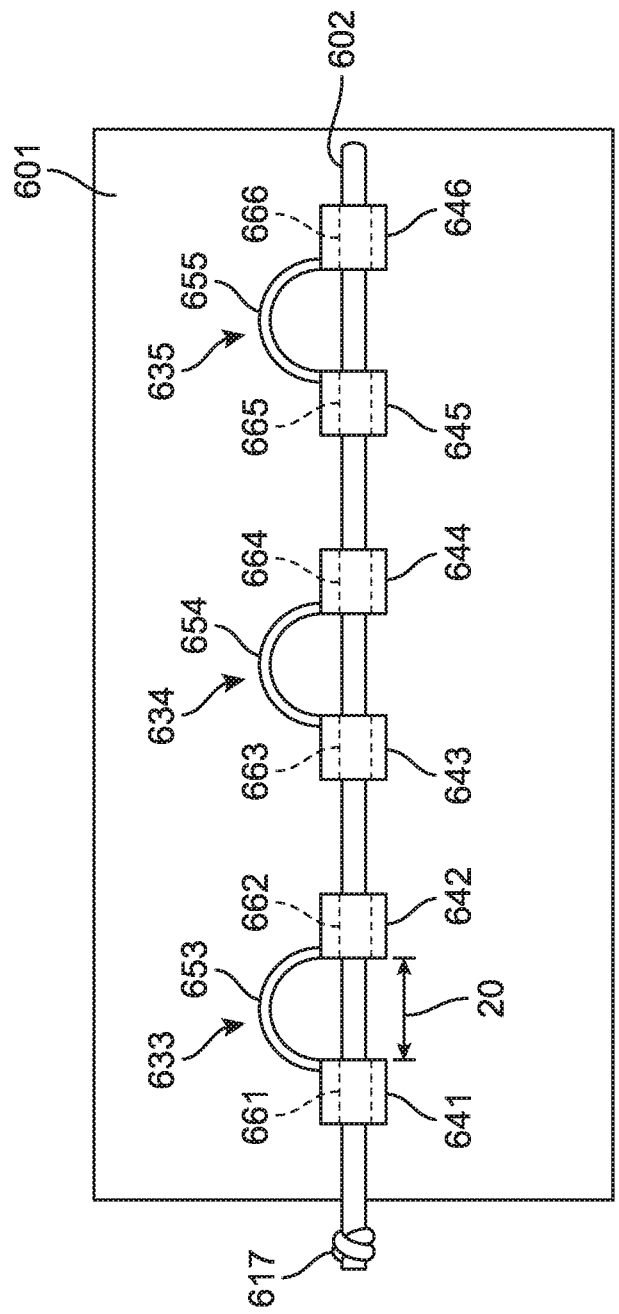
FIG. 20 is a schematic diagram of a plan view of a series of segmented tunnel structures in their unstressed configuration.

A sequential series of segmented tunnel structures may be laced through by a tensile strand. For example, as shown in FIG. 20, tensile strand 602 is laced through three segmented tunnel structures—through tunnel 661 and tunnel 662 in segmented tunnel structure 633, through tunnel 663 and tunnel 664 in segmented tunnel structure 634, and through tunnel 665 and tunnel 666 in segmented tunnel structure 635. In the unstressed configuration shown in FIG. 20, tensile strand 602 has not been pulled to force catching element 617 against tubular structure 641, and each of the segmented tunnel structures are spaced apart from each other. In this example, connecting portion 653, connecting portion 654, and connecting portion 655 all form a generally semi-circular arch when the segmented tunnel structures are in their unstressed condition. Also, in the uncompressed configuration, tubular structure 641 is maintained at a distance 20 from tubular structure 642; tubular structure 643 is maintained at a similar distance from tubular structure 644; and tubular structure 645 is maintained at a similar distance from tubular structure 646.

Figure 21:
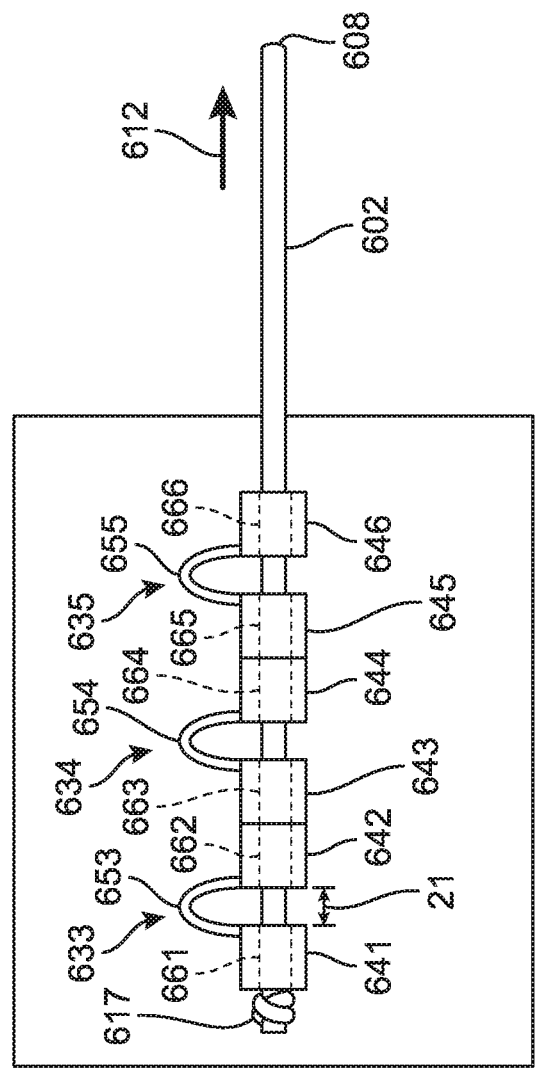
FIG. 21 is a schematic diagram of the embodiment of FIG. 20 under compressive tension.

In the configuration shown in FIG. 21, catching element 617 of tensile strand 602 has been pulled in the direction of arrow 612 against tubular structure 641 of segmented tunnel structure 633 forcing tubular structure 642 against tubular structure 643 of segmented tunnel structure 634, and tubular structure 644 against tubular structure 645. In this example, tunnel 662 in tubular structure 642 and tunnel 663 in tubular structure 643 abut, such that they form a continuous tunnel through tubular structure 642 and tubular structure 643. Similarly, tunnel 664 in tubular structure 644 and tunnel 665 in tubular structure 645 of segmented tunnel structure 635 abut, such that they form a continuous tunnel through tubular structure 644 and tubular structure 645. Connecting portion 653, connecting portion 654, and connecting portion 655 are under compressive stress, such that they form a narrower arch than they did in the unstressed configuration shown in FIG. 20, and such that distance 21 in FIG. 21 is less than distance 20 in FIG. 20.

Figure 22:
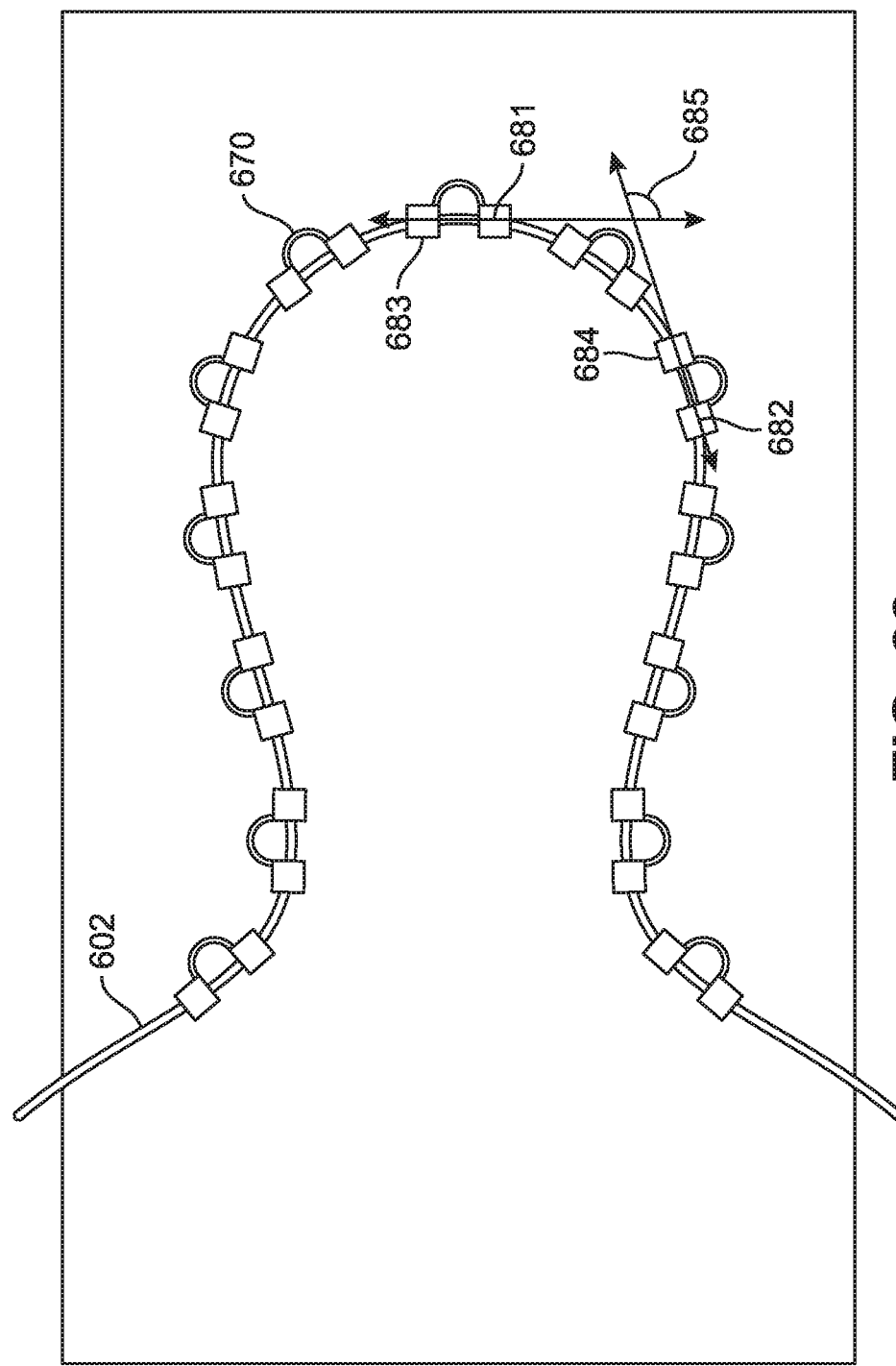
FIG. 22 is a schematic diagram of a tensile strand laced through embodiments of segmented tunnel structures.
Figure 23:
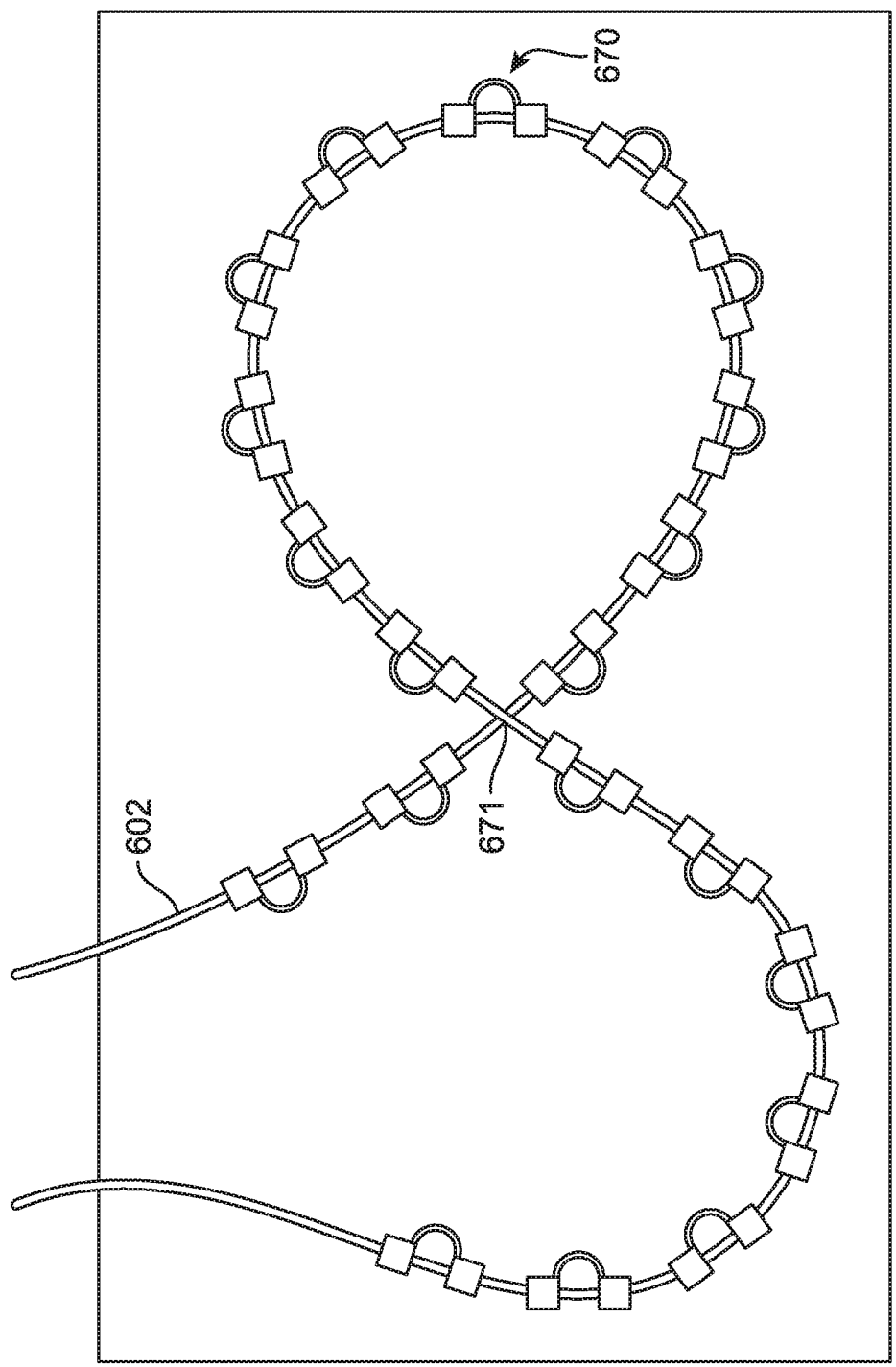
FIG. 23 is a schematic diagram of a tensile strand laced through embodiments of segmented tunnel structures.

The segmented tunnel structures shown in FIGS. 20 and 21 may be disposed in any appropriate configuration for a given application. For example, FIG. 22 and FIG. 23 show that a tensile strand 602 may be laced through multiple segmented tunnel structures 670 in different configurations. As shown in FIG. 22, different segmented tunnel structures may be orientated in different directions. For example, they may be disposed in linear, nonlinear, bent, curved, intersecting, closed, and/or open configurations. In FIG. 22, for example, when the segmented tunnel structure is not under tension and thus in a relaxed state, central axis 681 of segmented tunnel structure 683 is oriented in a different direction than central axis 682 of segmented tunnel structure 684. Specifically, central axis 681 forms an angle 685 with central axis 682, where angle 685 is different from 180 degrees (i.e., central axis 681 and central axis 682 are not collinear). These segmented tunnel structures may thus be used to control the geometry of the base layer upon which they may be attached in a variable manner, depending upon the magnitude of the tension applied to the tensile strand. Additionally, various arrangements of segmented tunnel structures may allow for any kinds of nonlinear paths for a tensile strand so that the tensile strand can be diverted around regions such as certain regions of an article overlying anatomical structures, or so that the tensile strand can otherwise be arranged in any desired three-dimensional arrangement on an article of footwear or other contoured article.

In the exemplary configuration shown in FIG. 22, tensile strand 602 and segmented tunnel structures 670 are disposed in an open configuration. On the other hand, tensile strand 602 and segmented tunnel structures 670 may be disposed in other configurations, including, for example, the configuration shown in FIG. 23, in which tensile strand 602 crosses over itself at a crossing point 671. Moreover, because any number and size of segmented tunnel structures may be used with a tensile strand, they may be used to implement any desired geometry of linear, nonlinear, curved, bent, or intersecting paths on an article of apparel, article of footwear, or other article that can be controlled by varying the tension on the tensile stand. In short, there are no inherent limitations to the configurations of segmented tunnel structures that may be used in applying the segmented tunnel structures to articles of footwear, articles of apparel, protective gear, or other articles of manufacture.

FIGS. 24-27 are examples of the application of tubular structures to articles of manufacture. Thus, FIG. 24 and FIG. 25 are schematic diagrams of a perspective lateral view of an article of footwear 700 illustrating the application of collapsible tunnel systems, such as the system illustrated in FIGS. 7-9 and the system illustrated in FIGS. 11-13, to an article of footwear. FIG. 24 illustrates the configuration of the tubular structures in their uncollapsed configuration and FIG. 25 illustrates the configuration of the tubular structures when they are fully collapsed. The article of footwear 700 shown schematically in FIG. 24 and FIG. 25 has two collapsible tunnel systems: collapsible tunnel system 705 around the ankle opening 711 of upper 701 and collapsible tunnel system 706 on the lateral side 709 of upper 701 at the midfoot of upper 701.

Collapsible tunnel system 705, which has components similar to the components illustrated in FIGS. 7-9, includes a tensile strand 721, two linear tubular structures (linear tubular structure 712 and linear tubular structure 713) and catching element 717. It may be used to provide additional support for a hi-top or medium-top article of footwear. In FIG. 24, collapsible tunnel system 705 is in an uncollapsed state, because tensile strand 721 is not pulled tight around ankle opening 711. When a wearer of the article of footwear 700 pulls tensile strand 721 tight to fasten collapsible tunnel system 705 around ankle opening 711, catching element 717 on the lateral side of ankle opening 711 forces linear tubular structure 712 on the lateral side of ankle opening 711 against linear tubular structure 713, as shown in FIG. 25. This concurrently also changes the geometry of the base layer 755 of the upper underlying and intermediate to linear tubular structure 712 and linear tubular structure 713. Although not shown in FIG. 24 or FIG. 25, a similar catching element on the medial side of ankle opening 711 forces similar tubular structures (also not shown) on the medial side of ankle opening 711 against each other.

Collapsible tunnel system 706, which has components similar to the components illustrated in FIGS. 11-13, includes a tensile strand 722 that has two loops 723 at one end and two catching elements 718 at its other end. Collapsible tunnel system 706 is shown in its uncollapsed state in FIG. 24, because tensile strand 722 has not been pulled up by shoelace 710. A wearer of the article of footwear 700 could lace shoelace 710 through loops 723. When shoelace 710 is pulled tight and tied in a bow, catching elements 718 force curved tubular structure 715 against linear tubular structures 725 and linear tubular structures 714 against linear tubular structures 724, as shown in FIG. 25. Thus applying tension to tensile strand 715 changes the geometry of the portion of the base layer 766 of upper 701 in the region intermediate between curved tubular structure 715 and linear tubular structures 725. Collapsible tunnel system 706 could function as a supportive and/or protective element for article of footwear 700.

Figure 26:
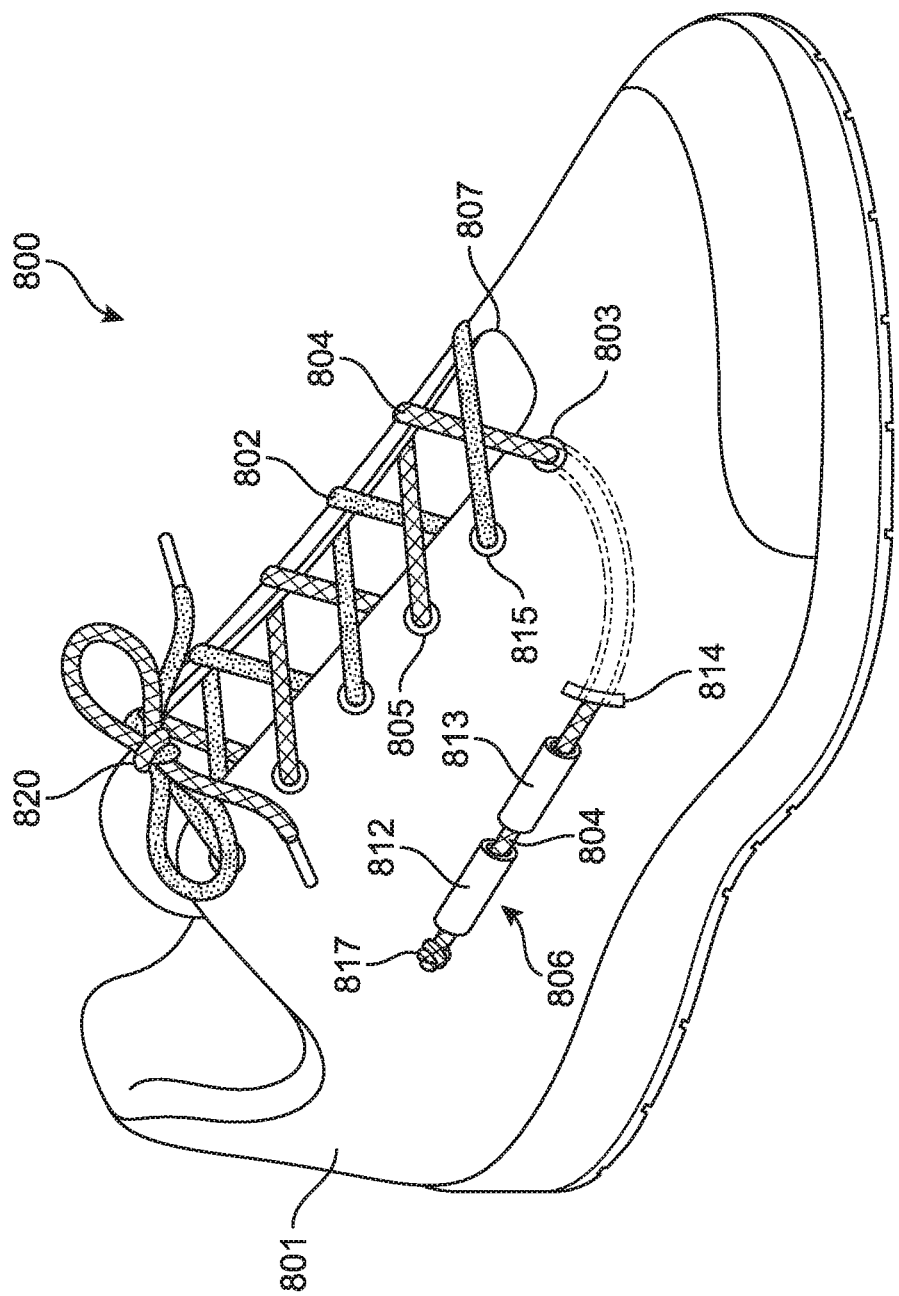
FIG. 26 is a schematic diagram of an article of footwear with an embodiment of a collapsible tunnel structure.

FIG. 26 illustrates another example of the application of a collapsible tunnel system to an article of footwear. In this example, article of footwear 800 has two tensile strands that also function as laces to fasten upper 801 over a wearer's foot. Tensile strand 804 on the lateral side of upper 801 is laced through tubular structure 812 and tubular structure 813 of collapsible tunnel system 806, then into aperture 814 on the side of upper 801. Tensile strand 804 is then laced through an eyelet 803 on the lateral side of tongue opening 807. It is then laced through every other eyelet 805 on each side of the tongue opening. A similar tensile strand 802 that may be laced through a pair of tubular structures on the medial side of upper 801 is also laced through every other eyelet 815 on each side of tongue opening 807. Tensile strand 802 and tensile strand 804 may then be pulled tight and fastened in a bow 820 at the top of tongue opening 807 to fasten upper 801 over a wearer's foot. Thus a part of tensile strand 802 and a part of tensile strand 804 function as two sides of a conventional shoelace. Collapsible tunnel system 806 may be used to allow a wearer to adjust the fit of an article of footwear at the sides of his or her foot.

Figure 27:
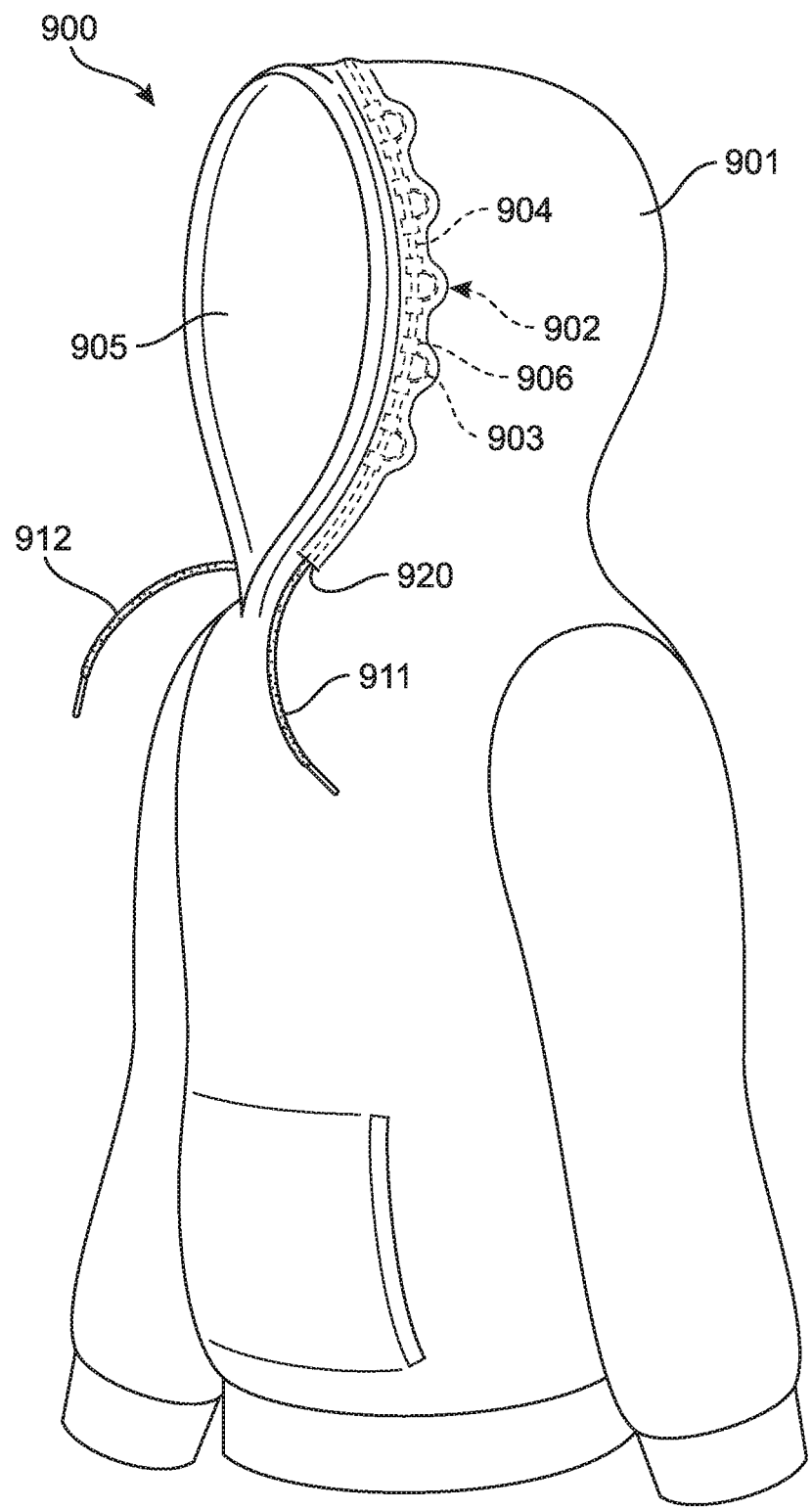
FIG. 27 is a schematic diagram of an article of apparel with embodiments of segmented tunnel structures.

FIG. 27 is a schematic diagram of an exemplary application of the segmented tunnel structures shown in FIG. 22 to an article of apparel, such as a hoodie 900. Each segmented tunnel structure 902 shown in FIG. 26 has two tubular tunnel structures 906 joined by a connecting portion 903. A tensile strand 904 is laced through tunnels in each of the tubular tunnel structures 906. End 911 of tensile strand 904 and end 912 of tensile strand 904 may then be pulled down to close the face opening 905 of the hood 901 around a wearer's face. End 911 and end 912 may be pulled through a tubular structure such as tubular structure 920 shown in FIG. 27. In this example, because the segmented tunnel structures are characterized by a certain level of rigidity, the wearer of the hoodie can tighten the hood down around his or her chin, without simultaneously forcing the circumference of the hood against his or her face.

Additive manufacturing processes may be used to form structures on flat receiving surfaces as well as on contoured or non-flat surfaces. For example, some embodiments depicted in the figures may illustrate methods whereby material is printed onto a flattened surface of an article, such as a material section of an upper that has a flat or unassembled configuration. In such cases, printing material onto the surface may be accomplished by depositing material in thin layers that are also flat. Thus, a print head or nozzle may move in one or more horizontal directions to apply an Nth layer of material and then move in the vertical direction to begin forming the N+1 layer. However, it should be understood that in other embodiments material could be printed onto a contoured or non-flat surface. For example, material could be printed onto a three-dimensional last, where the surface of the last is not flat. In such cases, the printed layers applied to the surface may also be contoured. In order to accomplish this method of printing, a print head or nozzle may be configured to move along a contoured surface and tilt, rotate or otherwise move so that the print head or nozzle is always aligned approximately normal to the surface where printed material is being applied. In some cases, a print head could be mounted to a robotic arm, such as an articulated robotic arm with six degrees of freedom. Alternatively, in still other embodiments, an object with a contoured surface could be re-oriented under a nozzle so that contoured layers of printed material could be applied to the object. For example, embodiments could make use of any of the systems, features, components and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

The printed structures of the present embodiments may provide enhanced support. In some cases, one or more printed structures may be attached to an underlying component such as a fabric layer of an upper or other article, and may act to enhance support over a portion of the component. This may occur in situations where the printed structure is more rigid than an underlying material (e.g., fabric, leather, etc.). In some cases, printed structures, such as tubular structures, could extend throughout portions of an article to form an external support system, like an exoskeleton, which helps provide increased support through those portions.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. An article of apparel comprising:
a flexible base layer that is moveable between a first configuration and a second configuration;
a plurality of tunnel structures sequentially arranged and attached to the flexible base layer, the plurality of tunnel structures defining a plurality of tunnel paths that extend from a first opening to a second opening, the plurality of tunnel paths being at least partially enclosed, at least some of the plurality of tunnel structures being spaced apart from adjacent ones of the plurality of tunnel structures with respective intermediate regions of the flexible base layer therebetween; and
a tensile strand that has a tensile strand path that extends along the plurality of tunnel paths and across the intermediate regions of the flexible base layer,
wherein applying tension to the tensile strand causes the flexible base layer to move from the first configuration to the second configuration, the first configuration being an unstressed configuration and the second configuration being a stressed configuration in which the spaced-apart tunnel structures are closer together than when in the unstressed configuration,
wherein the tensile strand path has one or more curved portions, and
wherein one or more of the plurality of tunnel structures has an interior surface that extends between the first opening and the second opening in a non-linear manner such that the interior surface is curved in a direction extending from the first opening to the second opening to define a curved tunnel path between the first opening and the second opening.

2. The article of apparel of claim 1, wherein, when in the first configuration, the tensile strand path extends in a first direction and in a second direction that is opposite the first direction.

3. The article of apparel of claim 1, wherein, when in the first configuration, the tensile strand path intersects with itself.

4. The article of apparel of claim 1, wherein the tensile strand forms an exposed loop between one or more pairs of adjacent ones of the plurality of tunnel structures.

5. The article of apparel of claim 1, wherein the tensile strand includes a catching element that is sized to restrict movement of the catching element through at least one of the plurality of tunnel paths.

6. The article of apparel of claim 5, wherein the catching element is a knot in the tensile strand.

7. The article of apparel of claim 5, wherein the catching element is located at an end of the tensile strand.

8. The article of apparel of claim 1, further comprising a connecting portion that extends between one or more of the spaced-apart tunnel structures.

9. The article of apparel of claim 8, wherein the connecting portion biases the one or more of the spaced-apart tunnel structures toward the first configuration.

10. The article of apparel of claim 1, wherein the plurality of tunnel structures are formed of a rigid material.

11. The article of apparel of claim 1, comprising an opening in the article of apparel, wherein the tensile strand path extends around at least a portion of the opening, and the opening is smaller in the second configuration than in the first configuration.

12. The article of apparel of claim 1, wherein the article of apparel is an article of footwear and the flexible base layer is an upper of the article of footwear.

13. The article of apparel of claim 1, wherein the article of apparel is an article of clothing.

14. The article of apparel of claim 13, wherein the article of clothing is a hoodie.

15. An article of apparel with a collapsible tunnel system attached to a base layer of the article of apparel, the collapsible tunnel system comprising:
  a plurality of tunnel structures sequentially arranged and attached to the base layer, the plurality of tunnel structures defining a plurality of tunnel paths that extend from a first opening to a second opening, the plurality of tunnel paths being at least partially enclosed, the plurality of tunnel structures including a first tunnel structure spaced apart from a second tunnel structure, the first tunnel structure having a first end, a second end, and a first tunnel path and the second tunnel structure having a third end, a fourth end, and a second tunnel path extending from the third end to the fourth end, and
  a tensile strand extending along a tensile strand path with at least one curved portion, the tensile strand path extending along the first tunnel path, the second tunnel path, and across a flexible intermediate region of the base layer between the second end of the first tunnel structure and the third end of the second tunnel structure;
  wherein the flexible intermediate region of the base layer extends a first distance between the second end of the first tunnel structure and the third end of the second tunnel structure when the collapsible tunnel system is in an uncollapsed configuration, and applying tension to the tensile strand causes the collapsible tunnel system to move to a collapsed configuration in which the flexible intermediate region of the base layer extends a second distance between the second end of the first tunnel structure and the third end of the second tunnel structure, the second distance being shorter than the first distance, and
  wherein one or more of the plurality of tunnel structures has an interior surface that extends between the first opening and the second opening in a non-linear manner such that the interior surface is curved in a direction extending from the first opening to the second opening to define a curved tunnel path between the first opening and the second opening.

16. The article of apparel of claim 15, wherein, when in the uncollapsed configuration, the tensile strand path extends in a first direction and in second direction that is opposite the first direction.

17. The article of apparel of claim 15, wherein the tensile strand includes a catching element that is sized to restrict movement of the catching element through at least one of the plurality of tunnel paths.

18. The article of apparel of claim 17, wherein the catching element is a knot in the tensile strand.

19. The article of apparel of claim 15, comprising an opening in the article of apparel, wherein the tensile strand path extends around at least a portion of the opening, and the opening is smaller in the collapsed configuration than in the uncollapsed configuration.

* * * * *